(12) United States Patent
Mikuriya et al.

(10) Patent No.: US 7,526,492 B2
(45) Date of Patent: Apr. 28, 2009

(54) DATA STRUCTURE OF MAP DATA, MAP DATA STORAGE MEDIUM, MAP DATA UPDATING METHOD AND MAP DATA PROCESSING APPARATUS

(75) Inventors: Makoto Mikuriya, Tokyo (JP); Masaharu Umezu, Tokyo (JP); Tomoya Ikeuchi, Tokyo (JP); Mitsuo Shimotani, Tokyo (JP); Hidehiko Ohki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 612 days.

(21) Appl. No.: 10/925,274

(22) Filed: Aug. 25, 2004

(65) Prior Publication Data

US 2005/0058155 A1    Mar. 17, 2005

(30) Foreign Application Priority Data

Aug. 26, 2003    (JP)    ............................ P2003-300810

(51) Int. Cl.
*G06F 17/30*    (2006.01)
(52) U.S. Cl. ........................ 707/100; 707/203; 701/208; 715/818
(58) Field of Classification Search ................. 707/100, 707/102, 104.1, 203; 701/200–210, 213, 701/55; 340/995.1, 995.12, 995.19; 715/818
See application file for complete search history.

(56) References Cited

U.S. PATENT DOCUMENTS

| | | | | |
|---|---|---|---|---|
| 5,109,344 | A * | 4/1992 | Kakihara et al. | 701/209 |
| 5,774,824 | A * | 6/1998 | Streit et al. | 701/207 |
| 6,011,494 | A * | 1/2000 | Watanabe et al. | 340/995.14 |
| 6,067,499 | A * | 5/2000 | Yagyu et al. | 701/201 |
| 6,178,377 | B1 * | 1/2001 | Ishihara et al. | 701/200 |
| 6,256,579 | B1 * | 7/2001 | Tanimoto | 701/201 |
| 6,317,686 | B1 * | 11/2001 | Ran | 701/210 |
| 6,330,453 | B1 * | 12/2001 | Suzuki et al. | 455/457 |
| 6,370,452 | B1 * | 4/2002 | Pfister | 701/23 |

(Continued)

FOREIGN PATENT DOCUMENTS

JP    8-292716 A    11/1996

(Continued)

OTHER PUBLICATIONS

"KIWI Format Ver. 1.10" published by Kiwi Discussion Committee, no date.

*Primary Examiner*—Cheryl Lewis
(74) *Attorney, Agent, or Firm*—Sughrue Mion, PLLC

(57) ABSTRACT

For map data, a road system is represented by using node data, which is information concerning nodes representing points along a road, and link data, which is information concerning a link representing a road between the points. A link row is a series of links representing a series of roads in a road system, and as link row data, link data for the links that constitute the link row are arranged in the order in which the links are connected. The node data for the individual nodes of the road system are provided separately from the link row data, and to identify nodes, node identifiers are provided for the nodes of the road system. The link data includes information indicating a node identifier for a node that is located at one link end defined in the direction of the link row.

19 Claims, 32 Drawing Sheets

U.S. PATENT DOCUMENTS

| | | | |
|---|---|---|---|
| 6,401,027 B1 * | 6/2002 | Xu et al. | 701/117 |
| 6,567,742 B2 * | 5/2003 | Umezu et al. | 701/208 |
| 6,598,016 B1 * | 7/2003 | Zavoli et al. | 704/251 |
| 6,622,090 B2 * | 9/2003 | Lin | 701/213 |
| 6,892,204 B2 * | 5/2005 | Haas et al. | 707/100 |
| 6,931,319 B2 * | 8/2005 | Adachi | 701/208 |
| 6,963,294 B2 * | 11/2005 | Kurosawa | 340/995.19 |
| 6,993,038 B2 * | 1/2006 | McCann | 370/401 |
| 2002/0004701 A1 * | 1/2002 | Nakano | 701/200 |
| 2002/0165663 A1 * | 11/2002 | Umezu et al. | 701/208 |
| 2003/0004636 A1 * | 1/2003 | Adachi | 701/201 |
| 2003/0033078 A1 * | 2/2003 | Kita et al. | 701/117 |
| 2003/0055555 A1 * | 3/2003 | Knockeart et al. | 701/202 |
| 2003/0078720 A1 * | 4/2003 | Adachi | 701/200 |
| 2003/0109984 A1 * | 6/2003 | Adachi | 701/208 |
| 2003/0110293 A1 * | 6/2003 | Friedman et al. | 709/245 |
| 2003/0122688 A1 * | 7/2003 | Niitsuma | 340/995.1 |
| 2003/0154019 A1 * | 8/2003 | Adachi et al. | 701/200 |
| 2003/0182051 A1 * | 9/2003 | Yamamoto | 701/200 |
| 2003/0182056 A1 * | 9/2003 | Nozaki et al. | 701/209 |
| 2004/0024524 A1 * | 2/2004 | Miyazawa | 701/211 |
| 2004/0215387 A1 * | 10/2004 | Adachi et al. | 701/208 |
| 2004/0236498 A1 * | 11/2004 | Le et al. | 701/200 |
| 2006/0173614 A1 * | 8/2006 | Nomura | 701/210 |

FOREIGN PATENT DOCUMENTS

| | | |
|---|---|---|
| JP | 2002-175593 A | 6/2002 |

* cited by examiner

FIG. 4

ROAD SYSTEM DATA

| ROAD SYSTEM DATA HEADER |
|---|
| NODE TABLE |
| NODE ADDITION LIST |
| LINK ROW TABLE |
| LINK ROW ADDITION LIST |

FIG. 5

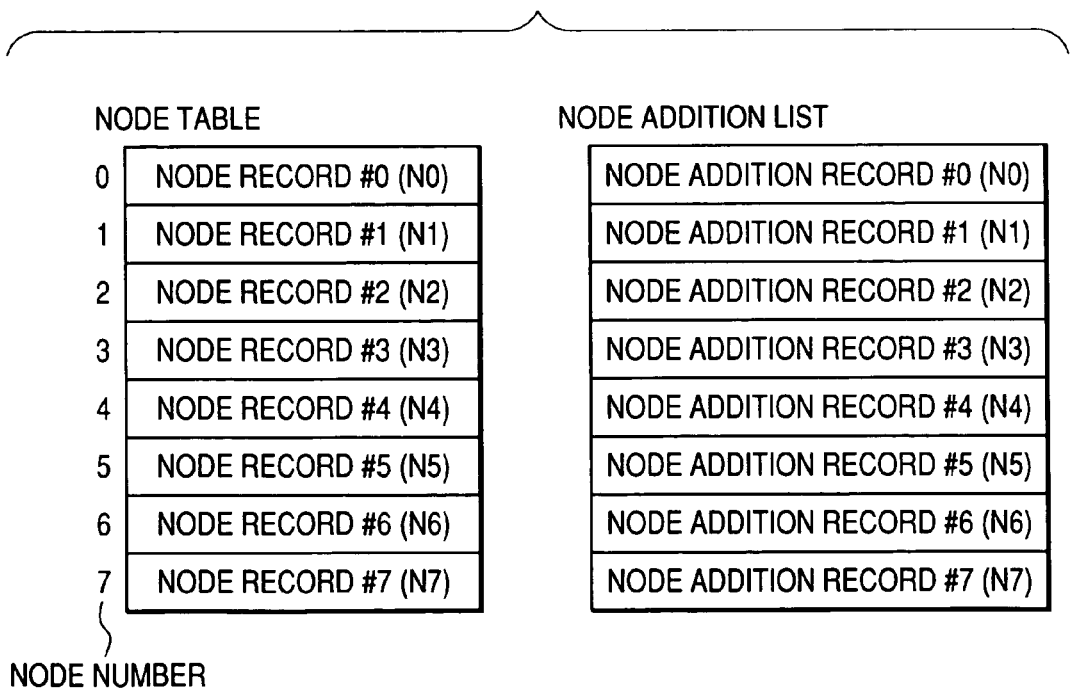

NODE TABLE

| | |
|---|---|
| 0 | NODE RECORD #0 (N0) |
| 1 | NODE RECORD #1 (N1) |
| 2 | NODE RECORD #2 (N2) |
| 3 | NODE RECORD #3 (N3) |
| 4 | NODE RECORD #4 (N4) |
| 5 | NODE RECORD #5 (N5) |
| 6 | NODE RECORD #6 (N6) |
| 7 | NODE RECORD #7 (N7) |

NODE NUMBER

NODE ADDITION LIST

| |
|---|
| NODE ADDITION RECORD #0 (N0) |
| NODE ADDITION RECORD #1 (N1) |
| NODE ADDITION RECORD #2 (N2) |
| NODE ADDITION RECORD #3 (N3) |
| NODE ADDITION RECORD #4 (N4) |
| NODE ADDITION RECORD #5 (N5) |
| NODE ADDITION RECORD #6 (N6) |
| NODE ADDITION RECORD #7 (N7) |

FIG. 9

|  | LINK ROW STATE | LINK ROW TYPE |
|---|---|---|
| LINK ROW RECORD #0 (LINK ROW 0) | 0 (EXISTING) | 4 (PREFECTUAL ROAD) |
| LINK ROW RECORD #1 (LINK ROW 1) | 0 (EXISTING) | 5 (ORDINARY ROAD) |
| LINK ROW RECORD #2 (LINK ROW 2) | 0 (EXISTING) | 5 (ORDINARY ROAD) |
| LINK ROW RECORD #3 (LINK ROW 3) | 0 (EXISTING) | 5 (ORDINARY ROAD) |

FIG. 10

LINK ROW ADDITION HEADER (LINK ROW 0)

| LINK ROW ADDITION RECORD SIZE | mlas0 |
|---|---|
| THE NUMBER OF LINK RECORDS | 4 |
| SMALLEST LINK NUMBER | 0 |
| LARGEST LINK NUMBER | 767 |
| DEFAULT ROAD WIDTH INFORMATION | dw0 |
| ROUTE NUMBER | rn0 |

LINK TABLE (LINK ROW 0)

| | | LINK STATE | LINK ADDITION PRESENCE/ABSENCE INFORMATION | LINK ROW SEGMENT NUMBER | LINK TYPE | ONE-WAY TRAFFIC INFORMATION | STARTING NODE NUMBER | LINK ADDITION POINTER |
|---|---|---|---|---|---|---|---|---|
| 0 | LINK RECORD #0 (L00) | 0 (EXISTING) | 1 (PRESENT) | INVALID VALUE | 0 (UP-AND-DOWN LANE NON-DIVIDED TRUNK) | 0 (NO REGULATION) | 0 | p0 |
| 1 | LINK RECORD #1 (L01) | 0 (EXISTING) | 1 (PRESENT) | INVALID VALUE | 0 (UP-AND-DOWN LANE NON-DIVIDED TRUNK) | 0 (NO REGULATION) | 1 | p1 |
| 2 | LINK RECORD #2 (L02) | 0 (EXISTING) | 0 (ABSENT) | INVALID VALUE | 0 (UP-AND-DOWN LANE NON-DIVIDED TRUNK) | 0 (NO REGULATION) | 2 | ARBITRARY VALUE |
| 3 | LINK RECORD #3 (L02' (VIRTUAL LINK)) | 0 (EXISTING) | 0 (ABSENT) | INVALID VALUE | — | — | 3 | ARBITRARY VALUE |

INTRA-LINK ROW LINK NUMBER

LINK ADDITION LIST (LINK ROW 0)

| | | LINK ADDITION HEADER | LINK SHAPE INFORMATION | LINK NUMBER INFORMATION | ROAD WIDTH INFORMATION |
|---|---|---|---|---|---|
| p0 | LINK ADDITION RECORD #0 (L00) | LINK ADDITION RECORD SIZE = las00 LINK SHAPE PRESENCE/ABSENCE INFORMATION: 1 (PRESENT) LINK NUMBER PRESENCE/ABSENCE INFORMATION: 0 (ABSENT) ROAD WIDTH PRESENCE/ABSENCE INFORMATION: 0 (ABSENT) | si00 | NOT PROVIDED | NOT PROVIDED |
| p1 | LINK ADDITION RECORD #1 (L01) | LINK ADDITION RECORD SIZE = las01 LINK SHAPE PRESENCE/ABSENCE INFORMATION: 1 (PRESENT) LINK NUMBER PRESENCE/ABSENCE INFORMATION: 0 (ABSENT) ROAD WIDTH PRESENCE/ABSENCE INFORMATION: 1 (PRESENT) | si01 | NOT PROVIDED | w01 |

LINK ADDITION RECORD ADDRESS

NODE RECORD

FIG. 13

| | NODE STATE | BOUNDARY INFORMATION | GUIDANCE PRESENCE/ABSENCE INFORMATION |
|---|---|---|---|
| NODE RECORD #0 (N0) | 0 (EXISTING) | 0 (INSIDE) | 0 (ABSENT) |
| NODE RECORD #1 (N1) | 0 (EXISTING) | 0 (INSIDE) | 1 (PRESENT) |
| NODE RECORD #2 (N2) | 0 (EXISTING) | 0 (INSIDE) | 1 (PRESENT) |
| NODE RECORD #3 (N3) | 0 (EXISTING) | 0 (INSIDE) | 0 (ABSENT) |
| NODE RECORD #4 (N4) | 0 (EXISTING) | 1 (BOUNDARY) | 0 (ABSENT) |
| NODE RECORD #5 (N5) | 0 (EXISTING) | 0 (INSIDE) | 0 (ABSENT) |
| NODE RECORD #6 (N6) | 0 (EXISTING) | 0 (INSIDE) | 0 (ABSENT) |
| NODE RECORD #7 (N7) | 0 (EXISTING) | 0 (INSIDE) | 0 (ABSENT) |

FIG. 14

| | NODE ADDITION HEADER | | | NODE COORDINATES | | CONNECTED LINK INFORMATION | | | | | INTER-LINK TRAFFIC REGULATION INFORMATION | | | | | |
|---|---|---|---|---|---|---|---|---|---|---|---|---|---|---|---|---|
| | | | | | | | CONNECTED LINK RECORD | | | | | TRAFFIC REGULATION RECORD | | | | |
| | NODE ADDITION RECORD SIZE | THE NUMBER OF CONNECTED LINK RECORDS | THE NUMBER OF TRAFFIC REGULATION RECORDS | LATITUDE | LONGITUDE | | NODE-BASE LINK NUMBER | CONNECTED LINK ROW NUMBER | INTRA-CONNECTED-LINK-ROW LINK NUMBER | ADJACENT AREA DESIGNATION | ADJACENT BOUNDARY NODE NUMBER | | APPROACHING-SIDE PRECEDING LINK DESIGNATION | NODE-BASE APPROACHING-SIDE LINK NUMBER | EXITING-SIDE PRECEDING LINK DESIGNATION | NODE-BASE EXITING-SIDE LINK NUMBER | TRAFFIC REGULATION CODE |
| NODE ADDITION RECORD #0 (N0) | ns0 | 1 | 0 | x0 | y0 | C00 | 0 | 0 | 0 | | | NO | | | | | |
| NODE ADDITION RECORD #1 (N1) | ns1 | 2 | 2 | x1 | y1 | C10 | 0 | 0 | 1 | | | R10 | 1 (PRECEDING LINK) | 0 | 1 (PRECEDING LINK) | 1 | rc10 |
| | | | | | | C11 | 1 | 3 | 1 | | | R11 | 0 (CURRENT LINK) | 1 | 1 (PRECEDING LINK) | 0 | rc11 |
| NODE ADDITION RECORD #2 (N2) | ns2 | 3 | 2 | x2 | y2 | C20 | 0 | 0 | 2 | | | R20 | 1 (PRECEDING LINK) | 1 | 0 (CURRENT LINK) | 0 | rc20 |
| | | | | | | C21 | 1 | 1 | 1 | | | R21 | 0 (CURRENT LINK) | 2 | 1 (PRECEDING LINK) | 0 | rc21 |
| | | | | | | C22 | 2 | 2 | 0 | | | | | | | | |
| NODE ADDITION RECORD #3 (N3) | ns3 | 1 | 0 | x3 | y3 | C30 | 0 | 0 | 3 | | | NO | | | | | |
| NODE ADDITION RECORD #4 (N4) | ns4 | 2 | 0 | x4 | y4 | C40 | 0 | 1 | 0 | | | NO | | | | | |
| | | | | | | C41 | | | | 2 (BELOW) | nx | | | | | | |
| NODE ADDITION RECORD #5 (N5) | ns5 | 1 | 0 | x5 | y5 | C50 | 0 | 2 | 1 | | | NO | | | | | |
| NODE ADDITION RECORD #6 (N6) | ns6 | 1 | 0 | x6 | y6 | C60 | 0 | 3 | 0 | | | NO | | | | | |
| NODE ADDITION RECORD #7 (N7) | ns7 | 1 | 0 | x7 | y7 | C70 | 0 | 3 | 2 | | | NO | | | | | |

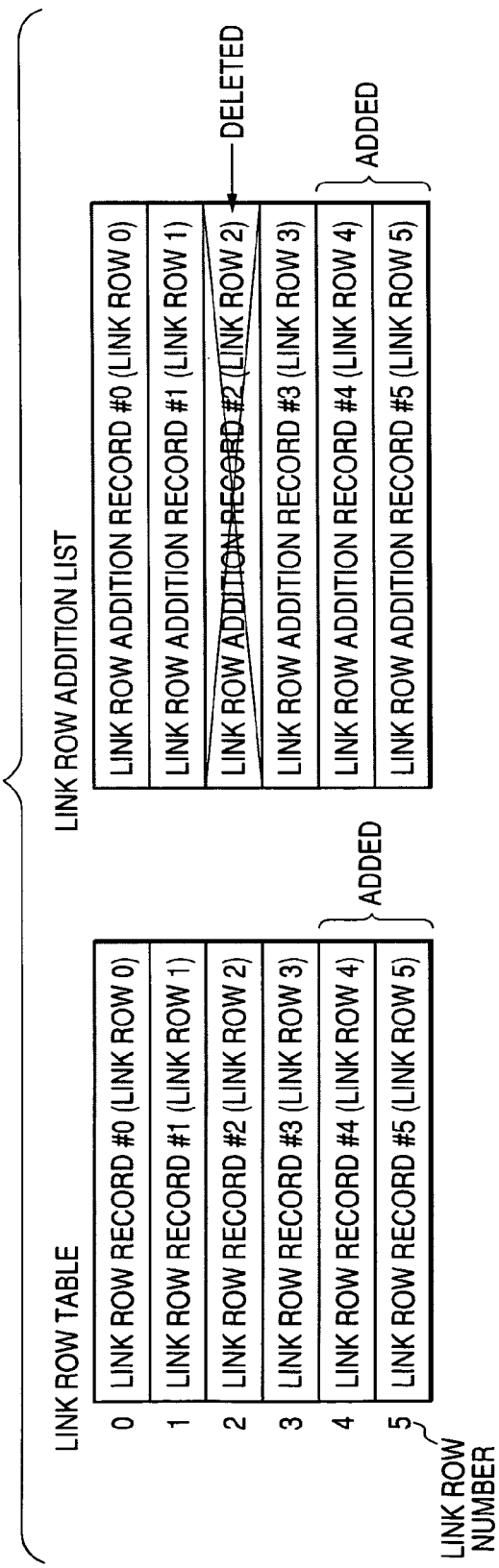

FIG. 21

LINK ROW ADDITION HEADER (LINK ROW 0)

| | |
|---|---|
| LINK ROW ADDITION RECORD SIZE | mlas0' |
| THE NUMBER OF LINK RECORDS | 4 |
| SMALLEST LINK NUMBER | 0 |
| LARGEST LINK NUMBER | 767 |
| DEFAULT ROAD WIDTH INFORMATION | dw0 |
| ROUTE NUMBER | rn0 |

LINK TABLE (LINK ROW 0)

| INTRA-LINK ROW LINK NUMBER | | LINK STATE | LINK ADDITION PRESENCE/ABSENCE INFORMATION | LINK ROW SEGMENT NUMBER | LINK TYPE | ONE-WAY TRAFFIC INFORMATION | STARTING NODE NUMBER | LINK ADDITION POINTER |
|---|---|---|---|---|---|---|---|---|
| 0 | LINK RECORD #0 (L00) | 2 (DIVIDED) | 0 (ABSENT) | 5 | 0 (UP-AND-DOWN LANE NON-DIVIDED TRUNK) | 0 (NO REGULATION) | 0 | p0 |
| 1 | LINK RECORD #1 (L01) | 1 (DISCONTINUED) | 0 (ABSENT) | INVALID VALUE | 0 (UP-AND-DOWN LANE NON-DIVIDED TRUNK) | 0 (NO REGULATION) | 1 | p1 |
| 2 | LINK RECORD #2 (L02) | 0 (EXISTING) | 0 (ABSENT) | INVALID VALUE | 0 (UP-AND-DOWN LANE NON-DIVIDED TRUNK) | 0 (NO REGULATION) | 2 | ARBITRARY VALUE |
| 3 | LINK RECORD #3 (L02' (VIRTUAL LINK)) | 0 (EXISTING) | 0 (ABSENT) | INVALID VALUE | — | — | 3 | ARBITRARY VALUE |

FIG. 22

| | NODE STATE | BOUNDARY INFORMATION | GUIDANCE PRESENCE/ABSENCE INFORMATION |
|---|---|---|---|
| NODE RECORD #0 (N0) | 0 (EXISTING) | 0 (INSIDE) | 0 (ABSENT) |
| NODE RECORD #1 (N1) | 0 (EXISTING) | 0 (INSIDE) | 0 (ABSENT) |
| NODE RECORD #2 (N2) | 0 (EXISTING) | 0 (INSIDE) | 1 (PRESENT) |
| NODE RECORD #3 (N3) | 0 (EXISTING) | 0 (INSIDE) | 0 (ABSENT) |
| NODE RECORD #4 (N4) | 0 (EXISTING) | 1 (BOUNDARY) | 0 (ABSENT) |
| NODE RECORD #5 (N5) | 1 (DISCONTINUED) | 0 (INSIDE) | 0 (ABSENT) |
| NODE RECORD #6 (N6) | 0 (EXISTING) | 0 (INSIDE) | 0 (ABSENT) |
| NODE RECORD #7 (N7) | 0 (EXISTING) | 0 (INSIDE) | 1 (PRESENT) |
| NODE RECORD #8 (N8) | 0 (EXISTING) | 0 (INSIDE) | 0 (ABSENT) |
| NODE RECORD #9 (N9) | 0 (EXISTING) | 0 (INSIDE) | 0 (ABSENT) |

Node Records #8 and #9: ADDED

FIG. 23

| | | | | NODE ADDITION RECORD #0 (N0) | NODE ADDITION RECORD #1 (N1) | NODE ADDITION RECORD #2 (N2) | NODE ADDITION RECORD #3 (N3) | NODE ADDITION RECORD #4 (N4) | NODE ADDITION RECORD #5 (N5) | NODE ADDITION RECORD #6 (N6) | NODE ADDITION RECORD #7 (N7) | NODE ADDITION RECORD #8 (N8) | NODE ADDITION RECORD #9 (N9) |
|---|---|---|---|---|---|---|---|---|---|---|---|---|---|
| | NODE ADDITION HEADER | | NODE ADDITION RECORD SIZE | nrs0 | nrs1 | nrs2 | nrs3 | nrs4 | | nrs6 | nrs7 | nrs8 | nrs9 |
| | | | THE NUMBER OF CONNECTED LINK RECORDS | 1 | 2 | 3 | 1 | 2 | | 1 | 1 | 1 | 2 |
| | | | THE NUMBER OF TRAFFIC REGULATION RECORDS | 0 | 2 | 2 | 0 | 0 | | 0 | 0 | 0 | 0 |
| | NODE COOR-DINATES | | LATITUDE | x0 | x1 | x2 | x3 | x4 | | x6 | x7 | x8 | x9 |
| | | | LONGITUDE | y0 | y1 | y2 | y3 | y4 | | y6 | y7 | y8 | y9 |
| | CONNECTED LINK INFORMATION | CONNECTED LINK RECORD | | C00 / C01 / | C10 / C11 / C12 | C20 / C21 / C22 / C23 | C30 | C40 / C41 | | C60 | C70 / C71 | C80 | C90 |
| | | | NODE-BASE LINK NUMBER | 0 | 1 / 0 | 0 / 1 / 2 / 0 | 0 | 0 / 1 | | 0 | 0 / 1 | 0 | 0 |
| | | | CONNECTED LINK ROW NUMBER | 5 | 3 / 5 | 0 / 1 / 4 / 0 | 1 | | | 3 | 3 / 4 | 4 | 5 |
| | | | INTRA-CONNECTED-LINK-ROW LINK NUMBER | 0 | 1 / 2 | 2 / 1 / 0 / 3 | 0 | | | 0 | 2 / 1 | 2 | 1 |
| | | | ADJACENT AREA DESIGNATION | | | | | | 2(BELOW) | | | | |
| | | | ADJACENT BOUNDARY NODE NUMBER | | | | | | nx | | | | |
| | INTER-LINK TRAFFIC REGULATION INFORMATION | TRAFFIC REGULATION RECORD | | NO | R10 / R11 | R20 / R21 / R22 | NO | NO | | NO | NO | NO | NO |
| | | | APPROACHING-SIDE PRECEDING LINK DESIGNATION | | 1 (PRECEDING LINK) / 0 (CURRENT LINK) | 1 (PRECEDING LINK) / 0 (CURRENT LINK) | | | | | | | |
| | | | NODE-BASE APPROACHING-SIDE LINK NUMBER | | 0 / 1 | 1 / 2 | | | | | | | |
| | | | EXITING-SIDE PRECEDING LINK DESIGNATION | | 1 (PRECEDING LINK) / 1 (PRECEDING LINK) | 0 (CURRENT LINK) / 1 (PRECEDING LINK) | | | | | | | |
| | | | NODE-BASE EXITING-SIDE LINK NUMBER | | 1 / 0 | 0 / 1 | | | | | | | |
| | | | TRAFFIC REGULATION CODE | | rc10 / rc11 | rc20 / rc22 | | | | | | | |

FIG. 24

LINK ROW ADDITION HEADER (LINK ROW 5)

| | |
|---|---|
| LINK ROW ADDITION RECORD SIZE | mlas5 |
| THE NUMBER OF LINK RECORDS | 3 |
| SMALLEST LINK NUMBER | 0 |
| LARGEST LINK NUMBER | 255 |
| DEFAULT ROAD WIDTH INFORMATION | dw0' |
| ROUTE NUMBER | rn0 |

LINK TABLE (LINK ROW 5)

| INTRA-LINK-ROW LINK NUMBER | | LINK STATE | LINK ADDITION PRESENCE/ABSENCE INFORMATION | LINK ROW SEGMENT NUMBER | LINK TYPE | ONE-WAY TRAFFIC INFORMATION | STARTING NODE NUMBER | LINK ADDITION POINTER |
|---|---|---|---|---|---|---|---|---|
| 0 | LINK RECORD #0 (L50) | 0 (EXISTING) | 1 (PRESENT) | INVALID VALUE | 0 (UP-AND-DOWN LANE NON-DIVIDED TRUNK) | 0 (NO REGULATION) | 0 | p50 |
| 1 | LINK RECORD #1 (L51) | 0 (EXISTING) | 1 (PRESENT) | INVALID VALUE | 0 (UP-AND-DOWN LANE NON-DIVIDED TRUNK) | 0 (NO REGULATION) | 9 | p51 |
| 2 | LINK RECORD #2 (L51' (VIRTUAL LINK)) | 0 (EXISTING) | 0 (ABSENT) | INVALID VALUE | — | — | 1 | ARBITRARY VALUE |

LINK ADDITION LIST (LINK ROW 5)

| LINK ADDITION RECORD ADDRESS | | LINK ADDITION HEADER | LINK SHAPE INFORMATION | LINK NUMBER INFORMATION | ROAD WIDTH INFORMATION |
|---|---|---|---|---|---|
| p50 | LINK ADDITION RECORD #0 (L50) | LINK ADDITION RECORD SIZE = las50<br>LINK SHAPE PRESENCE/ABSENCE INFORMATION: 1 (PRESENT)<br>LINK NUMBER PRESENCE/ABSENCE INFORMATION: 0 (ABSENT)<br>ROAD WIDTH PRESENCE/ABSENCE INFORMATION: 0 (ABSENT) | si00a | NOT PROVIDED | NOT PROVIDED |
| p51 | LINK ADDITION RECORD #1 (L51) | LINK ADDITION RECORD SIZE = las51<br>LINK SHAPE PRESENCE/ABSENCE INFORMATION: 1 (PRESENT)<br>LINK NUMBER PRESENCE/ABSENCE INFORMATION: 1 (PRESENT)<br>ROAD WIDTH PRESENCE/ABSENCE INFORMATION: 0 (ABSENT) | si01b | 128 | NOT PROVIDED |

FIG. 29

ROAD SYSTEM UPDATE DATA

| | UPDATE TARGET SUBJECT TYPE | UPDATE TARGET DATA TYPE | UPDATING OPERATION TYPE | THE NUMBER OF PARAMETERS | THE NUMBER OF OPERANDS | UPDATE TARGET SUBJECT DESIGNATION | UPDATE OPERAND LIST |
|---|---|---|---|---|---|---|---|
| UPDATE RECORD #r0 | 1 (NODE) | 3 (GUIDANCE PRESENCE/ABSENCE INFORMATION) | 10 (OVERWRITE) | 1 | 1 | 1 (NODE NUMBER) | GUIDANCE PRESENCE/ABSENCE INFORMATION (0 = (ABSENT)) |
| UPDATE RECORD #r1 | 1 (NODE) | 141 (TRAFFIC REGULATION RECORD) | 11 (DELETE) | 2 | 1 | 2 (NODE NUMBER), 1 (TRAFFIC REGULATION RECORD NUMBER) | |
| UPDATE RECORD #r2 | 1 (NODE) | 140 (INTER-LINK TRAFFIC REGULATION INFORMATION) | 13 (ADD) | 1 | 1 | 2 (NODE NUMBER) | TRAFFIC REGULATION RECORD R22 |
| UPDATE RECORD #r3 | 1 (NODE) | 0 (NOT DESIGNATED) | 0 (DISCONTINUE) | 1 | 0 | 5 (NODE NUMBER) | NONE |
| UPDATE RECORD #r4 | 1 (NODE) | 0 (NOT DESIGNATED) | 1 (ESTABLISH) | 0 | 2 | NONE | NODE RECORD #8, NODE ADDITION RECORD #8 |
| UPDATE RECORD #r5 | 1 (NODE) | 0 (NOT DESIGNATED) | 1 (ESTABLISH) | 0 | 2 | NONE | NODE RECORD #9, NODE ADDITION RECORD #9 |
| UPDATE RECORD #r6 | 2 (LINK) | 0 (NOT DESIGNATED) | 2 (LINK DIVIDE) | 2 | 1 | 0 (LINK ROW NUMBER), 0 (INTRA-LINK-ROW LINK NUMBER) | LINK ROW SEGMENT NUMBER (=5 (LINK ROW 5)) |
| UPDATE RECORD #r7 | 2 (LINK) | 0 (NOT DESIGNATED) | 0 (DISCONTINUE) | 2 | 0 | 0 (LINK ROW NUMBER), 1 (INTRA-LINK-ROW LINK NUMBER) | NONE |
| UPDATE RECORD #r8 | 3 (LINK ROW) | 0 (NOT DESIGNATED) | 0 (DISCONTINUE) | 1 | 0 | 2 (LINK ROW NUMBER) | NONE |
| UPDATE RECORD #r9 | 3 (LINK ROW) | 0 (NOT DESIGNATED) | 1 (ESTABLISH) | 0 | 2 | NONE | LINK ROW RECORD #4, LINK ROW ADDITION RECORD #4 |
| UPDATE RECORD #r10 | 3 (LINK ROW) | 0 (NOT DESIGNATED) | 1 (ESTABLISH) | 0 | 2 | NONE | LINK ROW RECORD #5, LINK ROW ADDITION RECORD #5 |

FIG. 30

ROUTE GUIDANCE UPDATE DATA

| | UPDATE TARGET SUBJECT TYPE | UPDATE TARGET DATA TYPE | UPDATING OPERATION TYPE | THE NUMBER OF PARAMETERS | THE NUMBER OF OPERANDS | UPDATE TARGET DESIGNATION | UPDATE OPERAND |
|---|---|---|---|---|---|---|---|
| UPDATE RECORD #g0 | 0 (NOT DESIGNATED) | 0 (ROUTE GUIDANCE RECORD) | 11 (DELETE) | 1 | 0 | 0 (ROUTE GUIDANCE RECORD NUMBER) | NONE |
| UPDATE RECORD #g1 | 0 (NOT DESIGNATED) | 0 (ROUTE GUIDANCE RECORD) | 13 (ADD) | 0 | 1 | NONE | ROUTE GUIDANCE RECORD #2 |

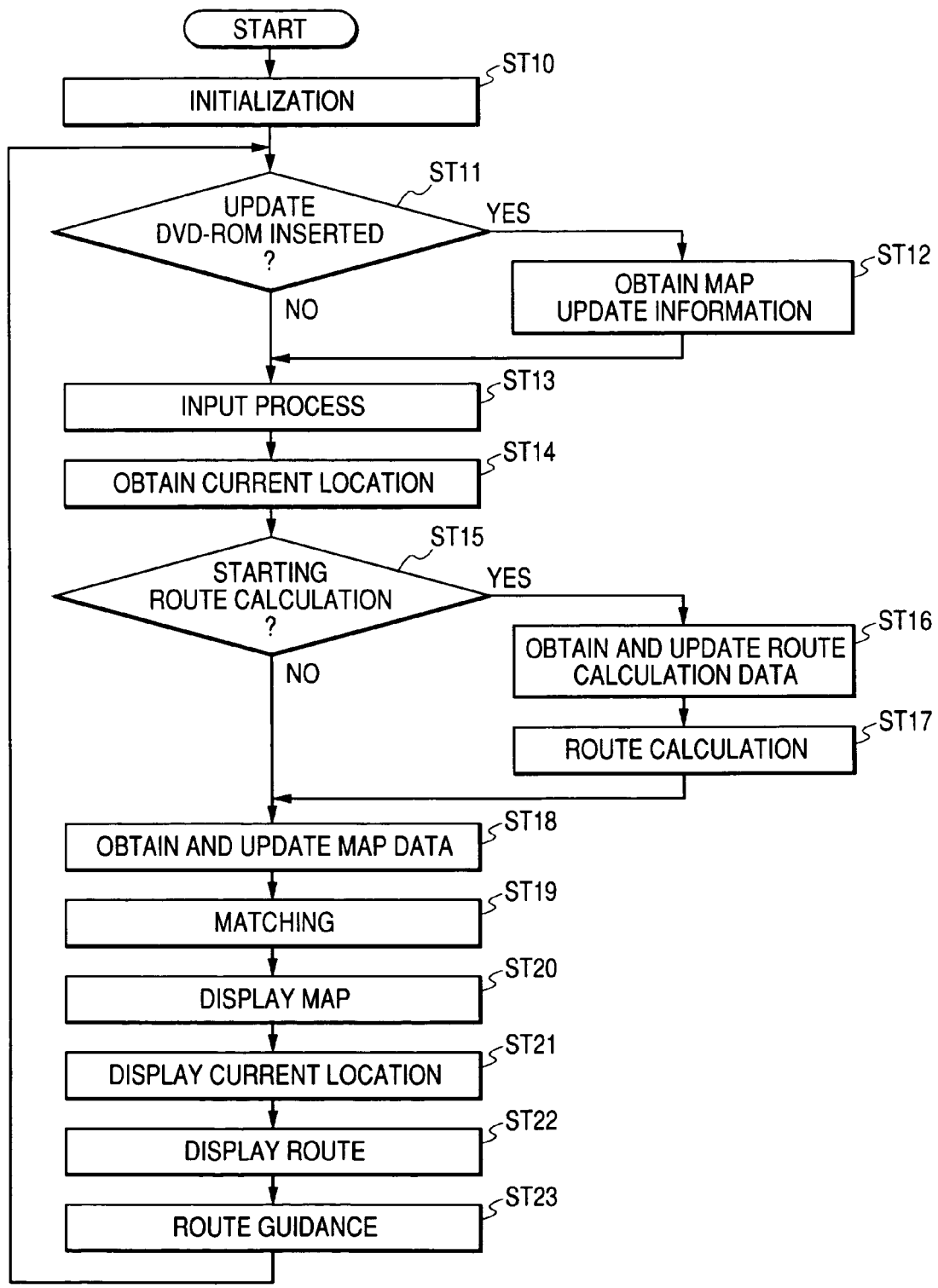

ROUTE DATA

| THE NUMBER OF LINKS = 2 |
| --- |
| ROUTE RECORD #0 (Lr00)<br>THE DIRECTION OF A ROUTE = 0 (FORWARD DIRECTION)<br>SMALLEST LINK NUMBER = 0<br>LARGEST LINK NUMBER = 255 |
| ROUTE RECORD #1 (Lr30)<br>THE DIRECTION OF A ROUTE = 1 (REVERSE DIRECTION)<br>SMALLEST LINK NUMBER = 1280<br>LARGEST LINK NUMBER = 1535 |

FIG. 40

LINK ADDITION LIST (LINK ROW 5)

| | LINK ADDITION HEADER | LINK SHAPE INFORMATION | LINK NUMBER INFORMATION | ROAD WIDTH INFORMATION |
|---|---|---|---|---|
| p50 LINK ADDITION RECORD #0 (L50) | LINK ADDITION RECORD SIZE = las50<br>LINK SHAPE PRESENCE/ABSENCE INFORMATION: 1 (PRESENT)<br>LINK NUMBER PRESENCE/ABSENCE INFORMATION: 0 (ABSENT)<br>ROAD WIDTH PRESENCE/ABSENCE INFORMATION: 0 (ABSENT) | si00a | NOT PROVIDED | NOT PROVIDED |
| p51 LINK ADDITION RECORD #1 (L51) | LINK ADDITION RECORD SIZE = las51<br>LINK SHAPE PRESENCE/ABSENCE INFORMATION: 1 (PRESENT)<br>LINK NUMBER PRESENCE/ABSENCE INFORMATION: 1 (PRESENT)<br>ROAD WIDTH PRESENCE/ABSENCE INFORMATION: 0 (ABSENT) | si01b | 64 | NOT PROVIDED |

LINK ADDITION RECORD ADDRESS

DATA STRUCTURE OF MAP DATA, MAP DATA STORAGE MEDIUM, MAP DATA UPDATING METHOD AND MAP DATA PROCESSING APPARATUS

BACKGROUND OF THE INVENTION

1. Field of the Invention

The present invention relates to the data structure of map data used by a mobile member, such as a car navigation system, a portable telephone or a portable data-terminal, or by a fixed computer terminal, a map data updating method, a map data storage medium and a map data processing apparatus.

2. Description of the Related Art

For the conventional map data used by a mobile member, such as a navigation system, a portable telephone or a portable data terminal, or a fixed computer terminal, a road system is represented by using nodes to show points along roads, links showing roads between the points and link rows in which a series of roads are shown as connected links, and information concerning the nodes and the links included in the link rows is included in link row data that represent the link rows. The connections between the links in the road system are represented by using identical node information that is included in the link row data and that identifies the nodes between the link rows (refer to JP-A-8-292716 and "Road Data Frame, Kiwi Format Ver. 1.10, Chapter 7.2" published by Kiwi Discussion Committee).

To describe a conventional map data traffic rule for links established between nodes, links approaching nodes and links exiting nodes are separately designated by using a node {travel order in accordance with identical node information} (refer to "Road Data Frame, Kiwi Format Ver. 1.10, Chapter 7.2").

To correlate links between hierarchical road systems and links between hierarchical road systems and those that are organized for other purposes, such as for route calculation, unique nationwide link numbers for conventional map data are provided for the individual links constituting the road systems at the lowest levels, so that within the link rows, the link numbers are sequential. Further, link numbers within a predetermined range are provided for the links so that even when links are divided, the continuity of the link numbers is maintained by providing link numbers from among those within the predetermined range (refer to "Road Data Frame, Kiwi Format Ver. 1.10, Chapter 7.2" and JP-A-2002-175593).

In addition, for the conventional map data, nodes are correlated with route guide data used as route guides at intersections, and information designating storage locations for the route guide data is provided for the nodes in link rows (refer to "Road Data Frame, Kiwi Format Ver. 1.10, Chapter 7.2").

SUMMARY OF THE INVENTION

For the conventional map data described in JP-A-8-292716 and "Road Data Frame, Kiwi Format Ver. 1.10, Chapter 7.2", node data representing nodes included in link rows and link data representing links are jointly included in link row data representing link rows.

According to the map data in these link rows, node data for nodes at which a plurality of link rows intersect are included and node data having the same contents are overlapped and stored. Therefore, when a node data update process is performed, since the node data for a plurality of link rows must be updated, the updating process becomes complicated.

Furthermore, for the conventional map data described in JP-A-8-292716 and "Road Data Frame, Kiwi Format Ver. 1.10, Chapter 7.2", the same node information provided for the individual nodes in the link rows are employed to represent the nodes in a specific link row that are identical to the nodes in another link row, and when, in accordance with an instruction for the identical node information, the nodes of the specific link row are tracked sequentially, beginning with a specific node, all the nodes that appear before the tracking returns to the first node are regarded as being the same. In this manner, it is possible to ascertain that the links in the individual link rows connected to these nodes are linked together.

With this arrangement, however, when the identical node information for a specific node A in a new link row X, which is to be established, describes a node B in a conventional link row Y, the nodes in another conventional link row described by identical node information must be sequentially tracked, beginning with the identical node information for the node B. Then, a node C in a link row Z, which indicates the node B for the conventional link row Y, must be found, and the identical node information for the node C in the link row Z must be changed so that this information describes the node A in the link row X. Therefore, a complicated updating process is required to establish a new link row.

Further, according to the conventional map data described in "Road Data Frame, Kiwi Format Ver. 1.10, Chapter 7.2", a link that approaches a node and a link that exits there from are represented by using the order in which the nodes appear when the nodes are tracked based on the identical nodes. Since the order is changed, depending on the discontinuance of a link row that appeared during the tracking performed using the identical node information, or the establishment of a new link row, information specifically setting out the traffic rules to be applied for a conventional approaching link and an exiting link must also be changed. The updating process, therefore, becomes complicated.

Moreover, according to the conventional map data described in JP-A-8-292716 and "Road Data Frame, Kiwi Format Ver. 1.10, Chapter 7.2", since when a link is divided, the intra-link node numbers of the following nodes and the storage locations are changed, the identical node information for other conventional link rows intersecting at these nodes must be changed. This complicates the updating process.

Furthermore, according to the conventional map data described in JP-A-2002-175593, since a link number in a range proportional to a link length is provided as the identifier for a link, the range for a link number for a road in a mountainous region having a large link length or a link number for a highway is enlarged, while the range for the link number for a city region having a small link length is narrowed more. Therefore, for a city region in which new roads are established that intersect conventional roads and expansions in the widths of roads occur frequently, the frequency at which links are divided is high, and there are cases wherein links can not be divided the number of times required. New link numbers must be provided in such a case for the link segments obtained by division and for a link at a higher level that includes these link segments, and for a link in a road system used for route calculation. As a result, the updating process becomes complicated.

In addition, according to the conventional map data described in "Road Data Frame, Kiwi Format Ver. 1.10, Chapter 7.2", route guide data representing the guide information used for an intersection are provided as node associated information, and address information, which indicates the storage location of the guide data for each node of the link row, is included in the link row data. Therefore, each time the route guide data are discontinued or established, the storage location of the conventional guide data is changed, so that the address information that indicates the storage location of the guide data included in the conventional link row data must be changed. As a result, the updating process becomes further complicated.

To resolve these shortcomings, it is one objective of the present invention to provide for the easy updating of map data.

According to this invention, provided is a data structure for map data that represents a road system using node data, which is information about nodes representing points along roads, and link data, which is information about links representing roads between the points, wherein a series of roads in the road system is represented by a link row, which is a connection of links; wherein, to form link row data, link data for links constituting a link row are arranged in the order in which the links were connected; wherein the node data for individual nodes of the road system are provided separately from the link row data, and for identifying a node, a node identifier is provided for each of the nodes of the road system; and wherein the link data includes information describing the node identifier of a specific node at a link end that is defined in accordance with the direction of the link row.

Further, link numbers within a unique range are provided for the individual links, and link numbers within this range are provided for specific links before the links are divided and are distributed as link segments. Then, the range of the link numbers thus obtained and distributed to the link segments is defined in accordance with the range of the segments obtained by equally dividing the link number range for a specific link.

Furthermore, for map data, wherein link numbers within a unique range are provided for the individual links, link numbers within this range, which are provided for the link segments before the division is performed, is distributed to the link segments obtained by the division. Then, the range for the link numbers thus distributed to the link segments is defined in accordance with a ratio of the length of the link before division to the length of the link segments.

According to the present invention, the data structure of map data is constituted by link row data and node data for nodes provided separately from the link row data, and the link data for the link row includes an identifier for one node at the link end that is defined in accordance with the direction of the link row. Therefore, the node data need not be overlapped before being stored, and the map data can be easily updated.

BRIEF DESCRIPTION OF THE DRAWING

These and other objects and advantages of this invention will become more fully apparent from the following detailed description taken with the accompanying drawings in which:

FIG. 4 is a diagram showing an example data structure for road system data according to the first embodiment;

FIG. 5 is a diagram showing example data structures for a node table and a node addition list according to the first embodiment;

FIG. 9 is a diagram showing a storage example for link row records according to the first embodiment;

FIG. 10 is a diagram showing a storage example for a link row addition record #0 in a link row 0 according to the first embodiment;

FIG. 13 is a diagram showing a data storage example for a node record according to the first embodiment;

FIG. 14 is a diagram showing a data storage example for a node addition record according to the first embodiment;

FIG. 19 is a diagram showing an example link row table and an example link row addition list obtained by updating performed according to the first embodiment;

FIG. 20 is a diagram showing an example wherein link row records are entered in a link row table according to the first embodiment;

FIG. 21 is a diagram showing examples according to the first embodiment for a link row addition header and a link table for link row addition record #0 for a link row 0 that are obtained by updating;

FIG. 22 is a diagram showing an example node table wherein the node records are stored according to the first embodiment;

FIG. 23 is a diagram showing an example according to the first embodiment for storing node addition records obtained by updating;

FIG. 24 is a diagram showing an example according to the first embodiment for storing data for link row addition record #5 for a link row 5 obtained by dividing a link;

FIG. 29 is a diagram showing a data storage example for road system update data according to the first embodiment;

FIG. 30 is a diagram showing a data storage example for route guidance update data according to the first embodiment;

FIG. 31 is a flowchart showing the operation of a map data processing apparatus according to the first embodiment;

FIG. 40 is a diagram showing a data storage example according to the second embodiment for a link addition list of a link row that includes link segments obtained by dividing a link.

DETAILED DESCRIPTION OF THE PREFERRED EMBODIMENTS

Preferred embodiments of the present invention will now be described.

First Embodiment

Figure 1:
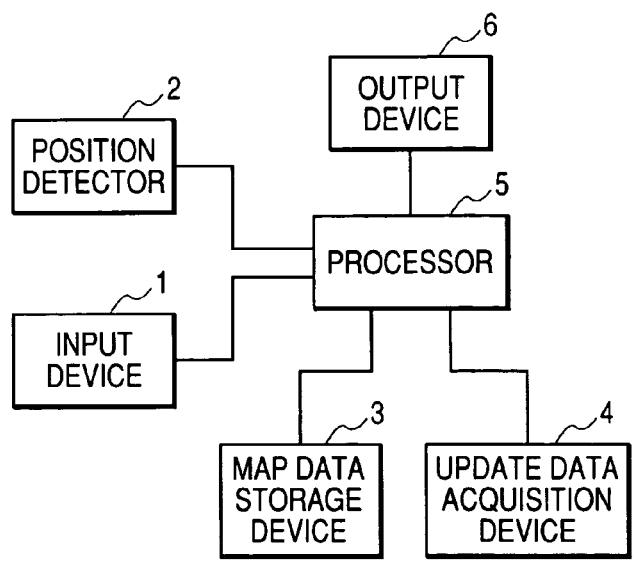
FIG. 1 is a block diagram showing the configuration of a map data processing apparatus according to a first embodiment of the present invention.

FIG. 1 is a block diagram showing the configuration of a map data processing apparatus according to a first embodiment of this invention.

In FIG. 1, an input device 1 transmits to a processor 5 an instruction signal corresponding to a manipulation performed by or an instruction entered by a user. Specifically, although not shown, the input device 1 may include at least either a voice recognition device, for identifying the voice of a user and outputting an instruction signal based on an oral command, a button manipulated by the user to output an instruction signal, or another appropriate input unit.

A position detector 2 employs, for example, a GPS (Global Positioning System) receiver, a vehicular velocity sensor and an angular velocity sensor to detect the current location of a vehicle on which the map data processing apparatus is mounted, and transmits the detected position information to the processor 5.

A map data storage device 3 serves as map data reading means for reading map data, map data acquisition means for obtaining map data, and map update data acquisition means for obtaining map update data. The map data storage device 3 is, for example, a hard disk drive that uses as a storage medium a hard disk on which map data are stored in advance, and map update data, which are also stored, obtained by an update data acquisition device 4.

The update data acquisition device 4 is, for example, a DVD (Digital Versatile Disk) drive for reading update data stored on a DVD-ROM (Read Only Memory).

The processor 5, which serves as map data updating means, performs various map data processes by using the current location obtained by the position detector 2 and map data read from the map data storage device 3.

The map data processes include: a map matching process, for estimating the current location of a vehicle based on the position data obtained by the position detector 2 and the map data; a route calculation (route search) process for calculating a route between a starting point and a destination point; a route display process, for displaying, on a display device, appropriate route choices obtained using the route calculation process and a route map; a route guidance process, for guiding a vehicle along an appropriate route from a starting point to a destination point; and a display process, for displaying a map of the area in the vicinity of the current location.

The map update data, obtained by the update data acquisition device 4 from the DVD-ROM, are stored in the map data storage device 3, and during the map data processing, the map update data, and the map data, are read from the map data storage device 3 and the map update data are used to update the map data.

An output device 6 presents information to a user in accordance with the map data process results output by the processor 5. Specifically, although not shown, the output device 6 may include a display device for displaying a map, a current location, route and guide information, and a voice generator for providing oral instructions or oral guidance for the user.

The data structure of the map data according to the first embodiment of the invention will now be described.

Figure 2:
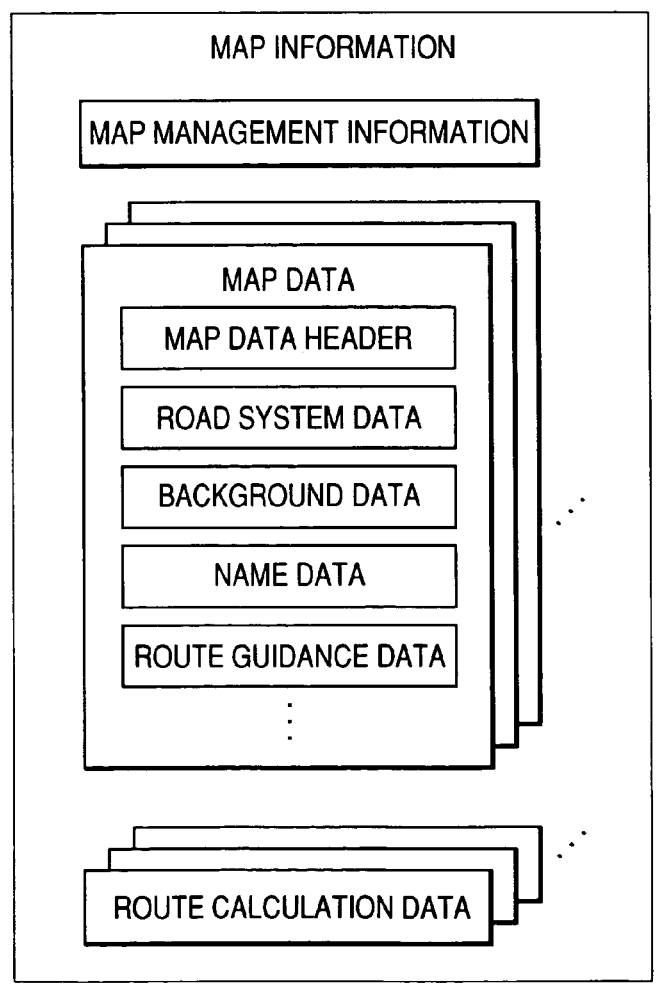
FIG. 2 is a schematic diagram showing a data structure for map information according to the first embodiment.

FIG. 2 is a schematic diagram showing the data structure of map data stored in the map data storage device 3. The map data includes map management data, one or more sets of map data and one or more sets of route calculation data.

The map data are hierarchically structured, based on the level of the details obtained for a road system, and for each hierarchical level, the entire country is divided into several areas and a map is prepared using data provided in correlation with the areas at each level. The road system for each area is represented by using nodes representing points along roads, links representing roads between the points, and link rows in which link connections are used to represent road connections. The route calculation data are also hierarchically structured, based on the level of the details obtained for the road system, and for each hierarchical level, the entire country is divided into several areas and the route calculation data is provided in correlation with each of the areas at each level. The road system for each area is represented by nodes representing points on roads and links representing the roads between the points.

The map management data, used for managing the map data and the route calculation data for each hierarchical level, includes, for each level, information used for correlating the map data and the route calculation data for each area, the locations of the map data and the route calculation data that are stored in the map management data, and the sizes of these data.

The map management data also includes information indicating the edition of the map data.

As is shown in FIG. 2, the map data includes road system data, indicating the shapes of roads, that are used for map matching and road display, and further information showing how the roads are connected, background data used for displaying map background details, such as rivers and seas, name data for using characters to display names, such as place names, and route guide data used for providing route guidance at intersections.

The route calculation data, which have a data structure differing from that of the road system data, is used to represent a road system when a route is being calculated. Link numbers for the links provided for the road system data that correspond to the links for the road system used when calculating a route are included in the route calculation data, and are used to correlate the links for both road systems.

Figure 3:
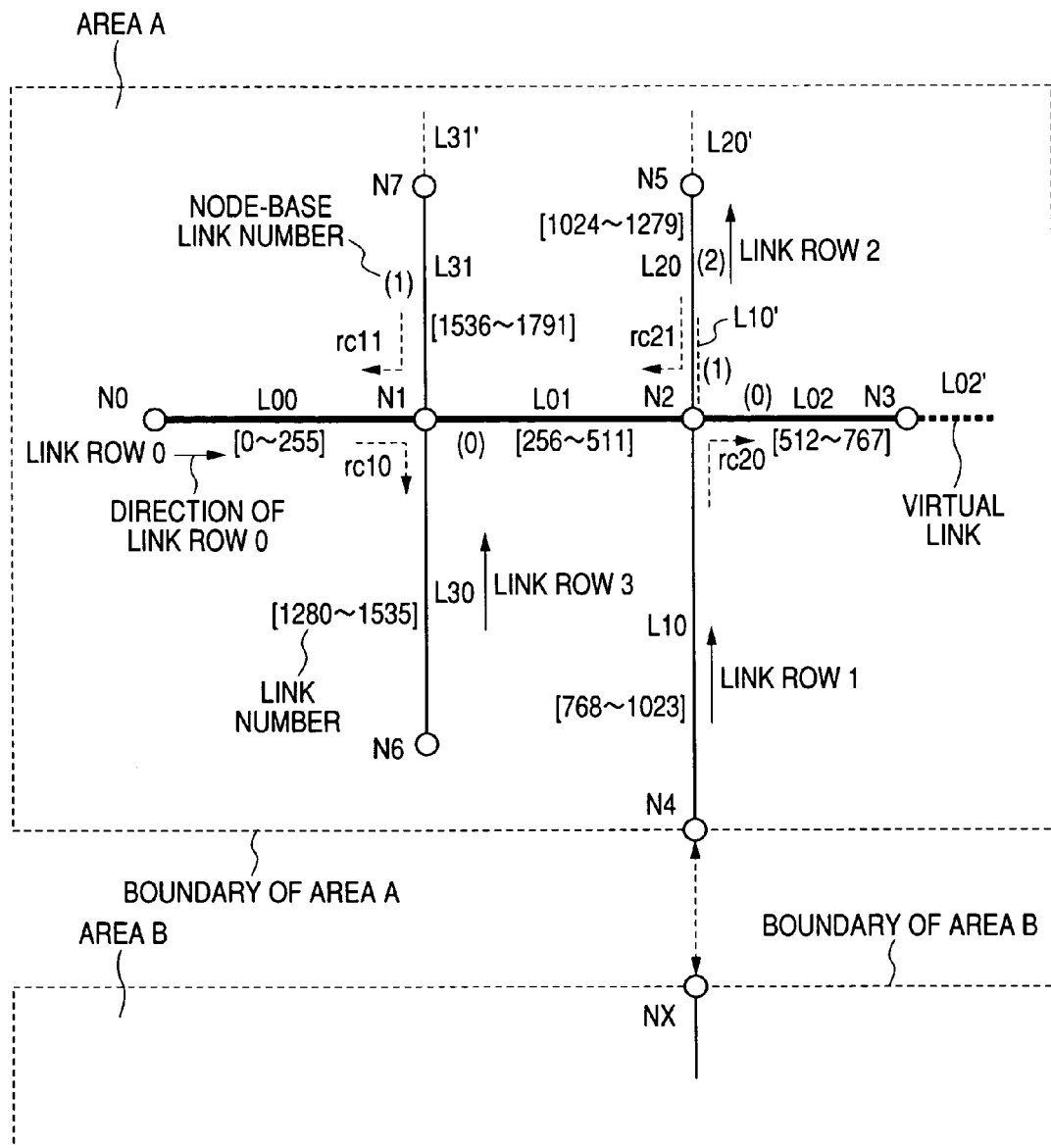
FIG. 3 is a diagram showing an example road system according to the first embodiment.

FIG. 3 is a diagram showing an example road system, represented by map data for a rectangular area A, at the lowest level, that provides the most detailed road system.

In FIG. 3, the road system is constituted by nodes N0 to N7 and links L00, L01, L02, L10, L20, L30 and L31. The links L00, L01 and L02 form a link row 0, the link L10 forms a link row 1, the link L20 forms a link row 2 and the links L30 and L31 form a rink row 3.

It is assumed that, for each link row, there is a link that employs the end node of a link row as the start node, and this link is called a virtual link. The virtual link is presumed to have no end node. In the following explanation, the link row is regarded as one that includes the virtual link.

In FIG. 3, the link employing the node N3 of the link row 0 as a start node is defined as a virtual link L2', and the link row 0 is defined as one that is formed of the links L00, L01 and L02 and the virtual link L02'.

Similarly, it is assumed that virtual links L10', L20' and L31' are present in the link rows 1, 2 and 3.

When the node at one end of a link row is defined as a starting point and the node at the other end is defined as an end point, the direction leading from the starting point to the end point is regarded as the link row direction.

In FIG. 3, solid arrows indicate the directions of the individual link rows, e.g., the starting node for the link row 0 is N0, the end node is N3, and the direction from the node N0 to the node N3 is the link row 0 direction.

The same direction as that of the link row is called the forward direction, and the direction opposite to that of the link row is called the reverse direction.

Since it is assumed that the direction of a link matches the link row direction, the starting node for the link is the node at the starting side of the link row, and the end node is the node at the end side of the link row.

In FIG. 3, the starting node for the link L0 is N1 and the end node is N2, and the forward direction for the link L00 is the direction leading from the node N1 to the node N2.

A link that is connected to a specific node N in the forward direction of a link row to which this link belongs is called a forward link for the node N, and a link connected in the reverse direction is called a reverse node for the node N. The forward links that are present for the node N are equivalent in number to the link rows that include the node N.

In FIG. 3, the links L00 and L00 connected to the node N1 belong to the link row 0. Since the link L00 is located in the forward direction of the link row 0 from the node N1, the link L00 is a forward link for the node N1, and since the link L00 is located in the reverse direction of the link row 0 from the node N1, the link L00 is a reverse link for the node N1. Similarly, the link L30 is a reverse link for the node N1, and the link L31 is a forward link for the node N1. In other words, for the node N1 there are two forward links, i.e., the links L01 and L31.

When links Lx and Ly belong to the same link row connected to a specific node N, and when the link Lx is a reverse link for the node N and the link Ly is a forward link for the node N, i.e., when the link Lx is located forward of the link Ly, the link Lx is called a preceding link for the link Ly, and the link Ly is called a succeeding link for the link Lx.

In FIG. 3, for the links L00 and L01 of the link row 0 connected to the node N1, the link L00 is the preceding link for the link L01, and the link L01 is the succeeding link for the link L00.

A reserve link for a specific node N is the preceding link for a forward link for the node N, and links connected to the node are the forward links for the node N and the preceding link. Therefore, when a forward link for a node is designated, all the links connected to this node can be specified.

In FIG. 3, for the links L00, L01, L30 and L31 connected to the node N1, when the forward links L01 and L31 for the node N1 are designated, the links L00 and L30 can be obtained as the preceding links for the links L01 and L31.

In order to identify the links connected to the node, node unit link identifiers are provided for the individual links connected to each node. Since the links connected to a node are specified in accordance with the forward link for the node, the numbers used to identify only the forward links for the node are provided as the node-base link identifiers, and these numbers are called node-base link numbers.

Further, information indicating that a link to be identified is a link indicated by the node-base link number (hereinafter referred to as a current link), or the preceding link for the link indicated by the node-base link number, is called the preceding designation.

The link connected to the node is specified in accordance with the node-base link number and the preceding designation information.

In FIG. 3, the node-base link numbers 0 and 1 are provided for the forward links L01 and L31 for the node N1, and node-base link numbers 0, 1 and 2 are provided for the forward links L02, L10' and L20 for the node N2.

For the node N1, the link L00 can be specified by setting the node-base link number=0 and the preceding designation=the preceding link, and the link L31 can be specified by setting the node-base link number=1 and the preceding designation=the current link.

In FIG. 3, an area B is an adjacent area below the area A, and a node N4 is a node located on the boundary line of the area A, and a node NX is a node located on the boundary line of the area B. A node located on the boundary line of an area is called a boundary node, and a node located inside the area, excluding the boundary, is called an internal node.

The nodes N4 and NX are located at the same point along the same road, i.e., at the intersection of the boundary lines for the areas A and B, and the road systems in the areas A and B are connected through the nodes N4 and NX. In this case, the node NX is called an adjacent boundary node for the node N4.

It should be noted that only one link is connected to the boundary node.

As link identifiers for identifying all the links in an entire area represented by the road system data of map data, link numbers in a unique range are provided for the individual links. In this embodiment, link numbers within a predetermined range are provided for links, i.e., for the links in a link row, sequential link numbers are provided in the ascending order in the forward direction. It should be noted, however, that a link number is not provided for a virtual link.

The predetermined range is called a link number setup constant, and is separately determined for each area.

In the first embodiment, the link number setup constant is 256, and link numbers from 0 to 255, from 256 to 511 and from 512 to 767 are provided for the links L00, L01 and L02 in the link row 0 in FIG. 3, link numbers from 768 to 1023 are provided for the link L10 in the link row 1, link numbers from 1024 to 1279 are provided for the link L20 in the link row 2, and link numbers from 1280 to 1535 and from 1536 to 1791 are provided for the links L30 and L31 in the link row 3. Similarly, link numbers differing from these are provided for links for other map data.

In the following explanation, the above described link numbers are provided for the individual links in FIG. 3.

FIG. 4 is a diagram showing an example data structure for road system data. The road system data includes a road system data header, a node table, a node addition list, a link row table, and a link row addition list.

The road system data header includes the number of nodes constituting a road system, the size of the data for the node addition list, the number of link rows constituting the road system, the size of the data for the link row addition list, and the link number setup constant.

FIG. 5 is a diagram showing example data structures for the node table and the node addition list included in the road system data representing the road system in FIG. 3.

The entries in the node table are node records having fixed lengths that are correlated with nodes, and the entries in the node addition list are node addition records having variable lengths that are correlated with the nodes.

In FIG. 5, node records #0 to #7 and node addition records #0 to #7 are provided in correlation with the nodes N0 to N7 in FIG. 3.

Information concerning a node is divided into a fixed length portion and a variable length portion, and while the fixed length portion is stored in the node record, the variable length portion is stored in the node addition record. Together, the node record and the node addition record form node data.

The locations of the sets of node data arranged in an array are employed as node identifiers for identifying corresponding nodes, and are called node numbers. Since the node data are stored separately, in the node table and the node addition list, the order in which node records forming the node data are arranged in the node table is employed as the order in which the node data are arranged. The node numbers for the nodes N0 to N7 in FIG. 3 are 0 to 7, which are provided for the correspondingly arranged node records.

Figure 6:
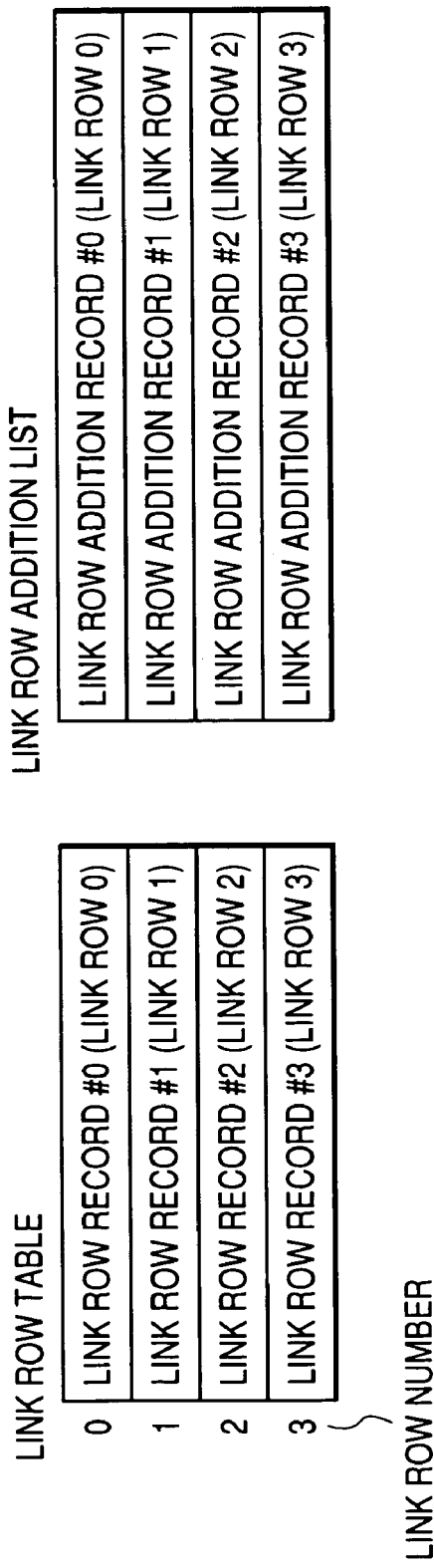
FIG. 6 is a diagram showing example data structures for a link row table and a link row addition list according to the first embodiment.

FIG. 6 is a diagram showing example data structures for the link row table and the link row addition list for the road system data representing the road system in FIG. 3.

The entries in the link row table are link row records that have fixed lengths and that are correlated with the link rows, and the entries in the link row addition list are link row addition records that have variable lengths and that are correlated with the link rows.

In FIG. 6, link row records #0 to #3 and link row addition records #0 to #3 are provided in correlation with the link rows 0 to 3 in FIG. 3.

The locations of the link row records in an array are employed as link row identifiers for corresponding link rows and are called link row numbers.

The respective link row numbers for the link rows 0, 1, 2 and 3 in FIG. 3 are 0, 1, 2 and 3.

Information concerning a link row is divided into a fixed length portion and a variable length portion, and while the fixed length portion is stored in the link row record, the variable length portion is stored in the link row addition record. Together, the link row record and the link row addition record constitute link row data.

As is described above, since the node data and the link row data are independently stored, one set of node data is stored for one node, and the stored node data are not overlapped.

Figure 7:
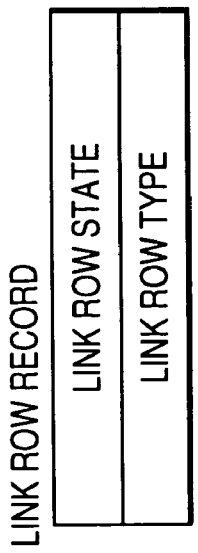
FIG. 7 is a diagram showing an example data structure for a link row record according to the first embodiment.

FIG. 7 is a diagram showing an example data structure for the link row record, in which a link row state and a link row type are included.

The link row state indicates the existing state or the discontinued state of the link row, and while the existing state means that the link row is being maintained, the discontinued state means that the link row has been discontinued.

The link row type indicates the road type for the link row, i.e., an expressway (0), an urban expressway (1), a national highway (2), a local main road (3), a prefectural road (4), or an ordinary road (5). It should be noted that the values in parentheses are those stored as link types in the link row record.

When the link row is discontinued, the corresponding link row record is not deleted; the link row state is simply set to the discontinued state, so that the link row numbers for the conventional link rows are prevented from being changed due to the discontinuance of the link row.

Further, when the link row is discontinued, the corresponding link row addition record is deleted, so that the holding of unnecessary data is avoided, and the data size for the updated road system data is reduced.

The link row record for a new link row is entered at the end of the link row table to prevent a change in the link row numbers for the conventional link rows.

Figure 8:
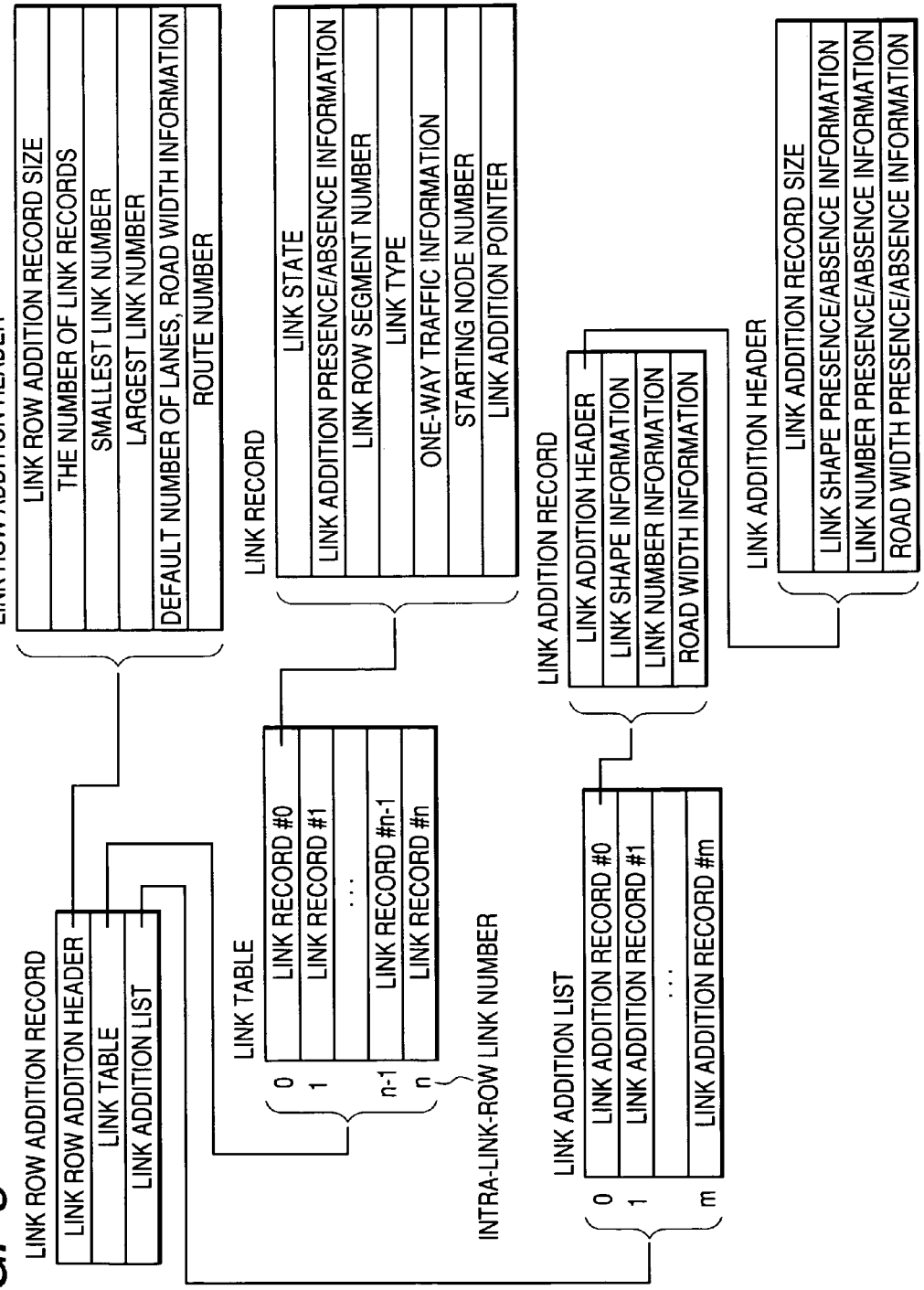
FIG. 8 is a diagram showing an example data structure for a link row addition record according to the first embodiment.

FIG. 8 is a diagram showing an example data structure for the link row addition record. The link row addition record includes a link row addition header, a link table and a link addition list.

The link row addition header includes a link row addition record size, the number of link records, the smallest link number, the largest link number, default road width information, and a route number.

The link row addition record size indicates the size of the data for a pertinent link row addition record.

The number of link records indicates the number of link records included in the link table of the link row addition record.

The smallest link number indicates the smallest value provided for the link numbers assigned to the links in the link row.

The largest link number indicates the greatest value provided for the link numbers assigned to the links in the link row.

The default road width information indicates the width of a road for the link row.

The route number indicates a road number for the link row.

The entries in the link table are link records having fixed lengths that are correlated with the links in the link row. The entries in the link addition list are link row addition records having variable lengths that are correlated with the links in the link row.

The information concerning the link is divided into a fixed length portion and a variable length portion, and while the fixed length portion is stored in the link record, the variable length portion is stored in the link addition record. Together, the link record and the link addition record form link data.

In the link table, the link records are arranged in correlation with the links in the order in which the links are arranged in the forward direction for the link row.

The locations of the link records arranged in the link table are employed as intra-link-row link identifiers in order to identify corresponding links in the link row, and these locations are called intra-link-row link numbers. The intra-link-row link identifiers, i.e., the intra-link-row link numbers are provided for the links in accordance with the direction of the link row.

In the link addition table, the link addition records are arranged in correlation with the links in the order in which the links are arranged in the forward direction of the link row. It should be noted, however, that a link addition record is not entered for a link for which a link addition record is not required.

When a link is discontinued or divided, the corresponding link record is not deleted; the link state is simply set to the discontinued state or the divided state, so that the intra-link-row link numbers for the conventional links are prevented from being changed due to the discontinuance or the division of the link.

Furthermore, when a link is discontinued or divided, the corresponding link addition record is deleted, so that the retention of unnecessary data is avoided, and the size of the updated road system data is reduced.

The link record includes a link state, link addition presence/absence information, a link segment row number, a link type, one-way information, a start node number, and a link addition pointer.

The link state is either the existing state, the discontinued state or the divided state of a link. The existing state indicates that the link is being maintained, the discontinued state indicates that the link has been discontinued, and the divided state indicates that the link has been divided.

The link addition presence/absence information indicates whether there is a corresponding link addition record for the link. A link addition record is not provided for a link that is in the discontinued or divided state, for a link that is in the existing state and that does not include information to be stored in the link addition record, or for a virtual link.

The link state and the link row segment number represent information concerning the link segment row. The link segment row number is effective only when the link row state is the divided state, and indicates the link row number of a link row that is formed of link segments obtained by dividing the link.

It should be noted that a link row formed of link segments obtained by dividing a link is called a link segment row.

As is described above, since the link state is included as information concerning a link segment row, whether the link has been divided can be determined, and since the link segment row number is provided, the location of the link row record for the link segment row can be immediately obtained.

The link type depends on the road structure, e.g., an up-and-down lane non-divided trunk link (0), an up-and-down lane divided trunk link (1), an inter-trunk bypass link (2) or an intersection link (3).

One-way information indicates whether the one-way regulation for a link is no regulation (0), no passing in the forward direction (1), or no passing in the reverse direction (2).

The starting node number is the node number for the starting node of a link. As is described above, the link record includes the node number for the starting node, which is a node at one end of the link that is defined in accordance with the direction of the link row. Since the node number for the end node in the link can be obtained based on the starting node number of the link record for a succeeding link, the node number for the end node is not held in the link record, only the node number for the start node is stored therein. Therefore, the size of the road system data can be reduced.

The link addition pointer points to an address based on the head of the link addition list, which is the location whereat the link addition record correlated with the link is stored in the link addition list. It should be noted that the values in parentheses (e.g., 0, 1 and 2) are those stored in the link record as link types and as one-way information.

The link addition record includes a link addition header, link shape information, link number information, and road width information.

The link addition header includes a link addition record size indicating the size of the data for a link addition record, link shape presence/absence information indicating whether there is link shape information, link number presence/absence information indicating whether there is link number information, and road width presence/absence information indicating whether there is road width information.

The link shape information indicates the shape of a road for the link, and includes an array of interpolation point coordinates, which represent the geographical locations of the vertexes in a sequential line graph representing the approximate road shape, and the number of interpolation point coordinates. When the road shape is linear, the link shape information is not provided.

The link number information indicates the smallest value provided for the link numbers. When link number information is present, the smallest value provided for the link numbers for the link is equal to the value indicated by the link number information, and the largest value is a value obtained by subtracting one from the smallest value provided for the link numbers of the succeeding link. It should be noted that the largest link number for the link addition header is provided as the largest value for the link numbers of the link that employs, as the end node, the end node of the link row.

When no link number information is present, the smallest and largest values of the link are obtained using the following equations (1) and (2).

$$\text{Largest value} = LIDMIN + \text{link number setup constant} \times LN \quad (1)$$

$$\text{Smallest value} = LIDMIN + \text{link number setup constant} \times (LN+1) - 1 \quad (2)$$

wherein LIDMIN denotes the smallest link number of the link row addition header, and LN denotes the intra-link-row link number of the link.

The road width information indicates the width of a road for the link. When the road width information is present, the value indicated by this information is used as the road width for the link. When the road width information is not present, a value is employed that is indicated by default road width information included in the link row addition header.

FIG. 9 is a diagram showing an example wherein the link row records in FIG. 6 are stored. In FIG. 9, link rows 0 to 3 in FIG. 3 are present, and a 0 (existing) is entered as the link row state for link row records #0 to #3. The link row 0 consists of links for prefectural roads, and a 4 (a prefectural road) is entered as the link row type for link row record #0. The link rows 1 to 3 consist of links for ordinary roads, and a 5 (an ordinary road) is entered as the link row type for link row records #1 to #3.

FIG. 10 is a diagram showing an example wherein link row addition record #0 for the link row 0 in FIG. 6 is stored. In FIG. 10, all the links in the link row 0 are regarded as existing, and the size of the data for the link row addition record for the link row 0 is mlas0, and for all the links in the link row 0, the road type is a prefectural road, the link type is an up-and-down lane non-divided trunk, and there is no one-way regulation.

Further, the road widths for the links other than the link L00 in the link row 0 are dw0, while the road width for the link L00 is w01. The route numbers for all the links in the link row 0 are rn0, and the road shapes for the links L00 and L00 are those represented by link shape information si00 and si01, while the road shape for the link L00 is linear and does not include the link shape information.

In the link row addition header in FIG. 10, mlas0 is entered as the link row addition record size; a value of 4, which includes the link record for a virtual link, is entered as the number of link records; a smallest value 0, for the link number of the link L00, is entered as the smallest link number; a large value 767, for the link number of the link L02, is entered as the largest link number; width dw0 is entered as default road width information; and rn0 is entered as a route number.

In the link table in FIG. 10, link records #0 to #3 are entered for the links L00, L00 and L02, and the virtual link L02', and intra-link-row link numbers 0, 1, 2 and 3 are provided for the links L00, L01 and L02, and the virtual link L021.

For the link records #0 to #3, a 0 (existing) is entered as the link state, a 0 (up-and-down lane non-divided trunk) is entered as a link type, a 0 (no regulation) is entered as one-way information, and a specific null value representing invalidity is entered as a link segment number.

N0, N1, N2 and N3 are entered as the start nodes for the links L00, L00 and L02 and the virtual link L02', and node numbers 0, 1, 2 and 3 for the nodes N0, N1, N2 and N3 are entered as the start node numbers for the link records #0 to #3.

Since the link shape information is not provided for the link L02, and the road width is dw0, as indicated by the default width information, the link addition record is not necessary, and a 0 (absent) is entered as the link addition presence/absence information for link record #2. Further, since link record #3 corresponds to the virtual link, a 0 (absent) is entered as link addition presence/absence information.

The link shape information is provided for the link L00, and since the road width is w01 that differs from the default road width information, not only the link shape information but also the road width information is provided for the link L01. Therefore, "1 (present)" is entered as the link addition presence/absence information in link records #0 and #1, and link addition records #0 and #1 are provided for the links L00 and L01. Addresses p0 and p1 for link addition records #0 and #1 are entered as link addition pointers in link records #0 and #1. Since a corresponding link addition record is not present for the link addition pointer in link records #3 and #4, an arbitrary value is entered.

For link addition record #0 in FIG. 10, a link addition header is entered that designates data size las00 and includes only link shape information, and si00 is entered as the link shape information.

For link addition record #1 in FIG. 10, a link addition header is entered that designates data size las01 and includes the link shape information and road width information, si01 is entered as the link shape information, and w01 is entered as the road width information.

Figure 11:
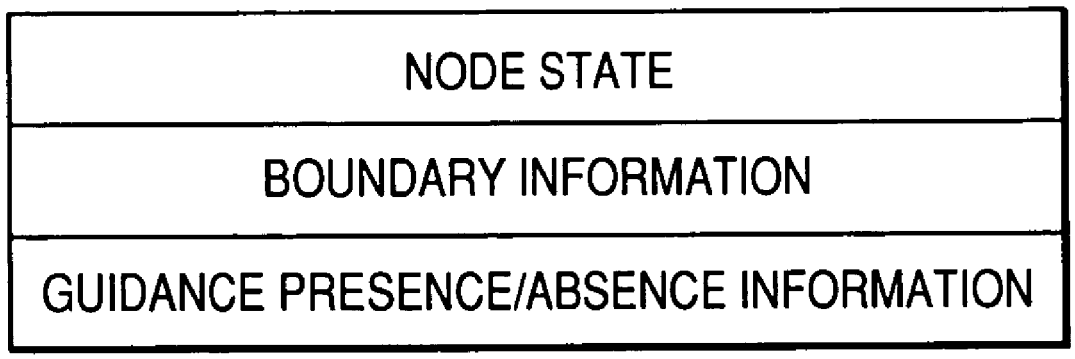
FIG. 11 is a diagram showing an example data structure for a node record according to the first embodiment.

FIG. 11 is a diagram showing an example data structure for the node record. The node record includes a node state, boundary information and guidance presence/absence information.

The node state indicates whether a node exists or has been discontinued.

The boundary information indicates whether a node is located on the boundary of the area on the map data or inside the boundary.

The guidance presence/absence information indicates whether there is the route guidance record for route guidance data that corresponds to the node.

When the node is discontinued, the corresponding node record is not deleted and the discontinued state is set as the node state, so that the node numbers for the conventional nodes are prevented from being changed due to the discontinuance of the node.

Furthermore, when the node is discontinued, the corresponding node addition record is deleted, so that the retention of unnecessary data is avoided, and the size of the updated road system data is reduced.

In addition, the node record for a new node is entered at the end of the node table to prevent a change in the node numbers for the conventional nodes.

Figure 12:
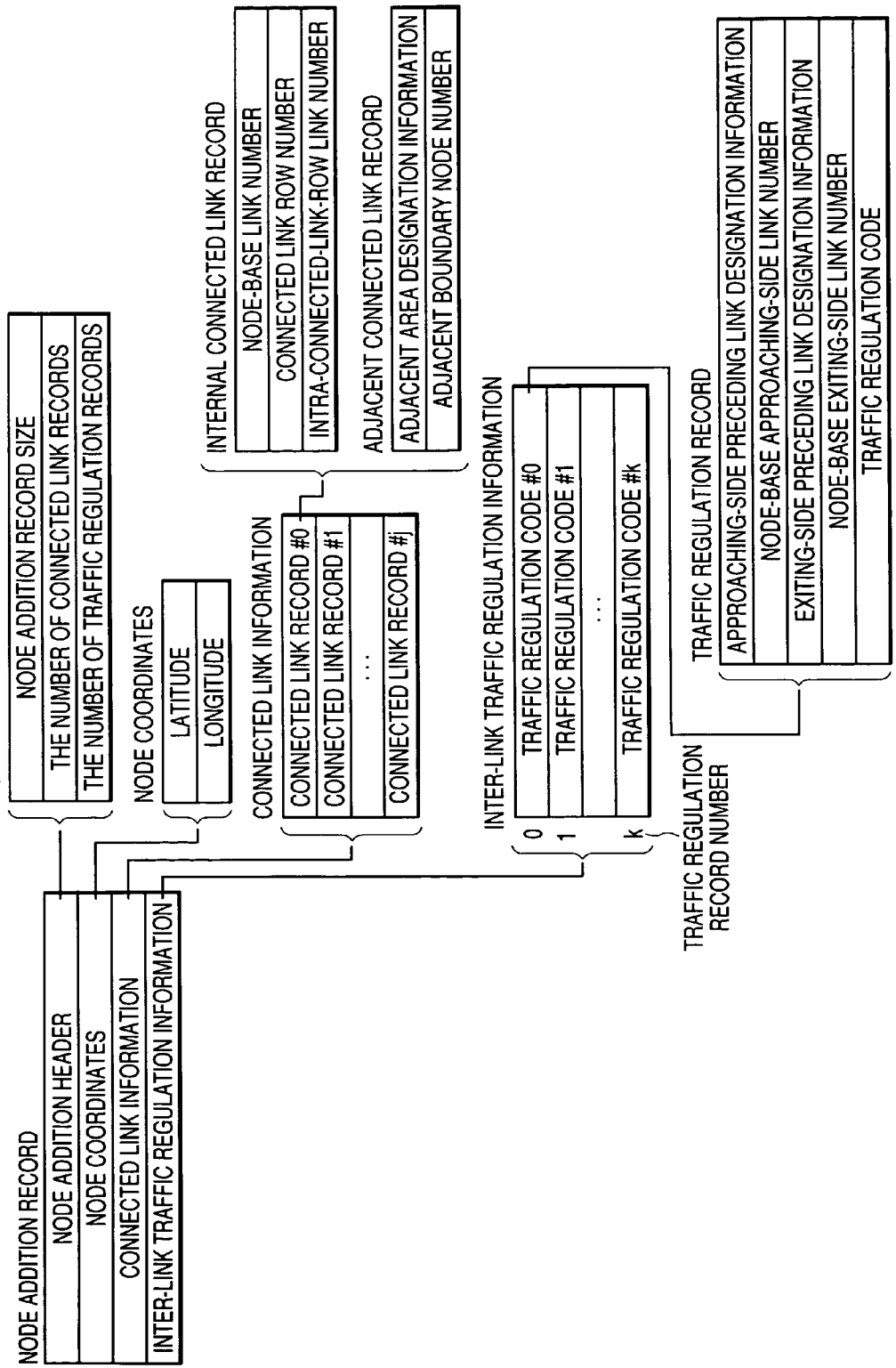
FIG. 12 is a diagram showing an example data structure for a node addition record according to the first embodiment.

FIG. 12 is a diagram showing an example data structure for a node addition record. The node addition record includes a node addition header, node coordinates, connected link information and inter-link traffic regulation information.

The node addition header includes a node addition record size, indicating the size of the data for the node addition record, the number of connected link records, indicating the number of connected link records included in the connected link information, and the number of traffic regulation records, indicating the number of traffic regulation records included in the inter-link traffic regulation information.

Node coordinates are used to show the latitude and the longitude of the geographical location of a node that corresponds to the node addition record.

The connected link information is an array of connected link records having fixed lengths and consisting of two types: internal connected link records and adjacent connected link records.

The internal connected link records indicate forward links for a node and node-base link identifiers used for identifying the links, and adjacent connected link records indicating the adjacent boundary nodes for the node.

The internal connected link records, which are equivalent in number to the link rows and include links connected to the pertinent node, are included in the connected link information. When the pertinent node is a boundary node, an adjacent connected link record is entered following the internal connected link record.

The internal connected link record includes a node-base link number, a connected link row number and an intra-connected-link-row link number.

The connected link row number and the intra-connected-link-row link number, which constitute connected link designation information, specify for a node a forward link for the link row that includes a link connected to this node, and indicate the link row number and the intra-link-row link number of the forward link.

As is described above, the connected link designation information designates a forward link for the node in accordance with the direction of the link row.

The node-base link number indicates a number provided for a link that is pointed at by a connected link row number and an intra-connected-link-row link number. The node-base link number is a node-base link identifier provided for identifying the forward link of a node, for each of which a unique number is provided. It should be noted that the node-base link number is not changed so long as the pertinent link exists.

Therefore, the node-base link number is unchanged, regardless of whether another link is discontinued or a new link is established. In this embodiment, 0 to 15 are employed as node-base link numbers.

As is described above, the forward link for a node can be specified by using the connected link row number and the intra-connected-link-row link number included in the internal connected link record, and the intra-link-row link number for a reverse link of a node is obtained by subtracting one from the intra-connected-link-row link number of the internal connected link record. It should be noted, however, that there is no reverse link for a node when the intra-connected-link-row link number is 0.

By referring to the internal connected link records that are thus arranged in the connected link information, all the links connected to this link can be immediately specified.

The adjacent connected link record includes adjacent area designation information and an adjacent boundary node number. The adjacent area designation information indicates the position, relative to the area of a boundary node, of the adjacent area to which the adjacent boundary node belongs, i.e., above (0), right (1), below (2) and left (3). The adjacent boundary node number indicates the node number of the adjacent boundary node in the adjacent area.

The values in parentheses are those stored in the adjacent connected link record as the adjacent area designation information.

When the states of the forward link for the node and the preceding link in the connected link information indicate both have been discontinued or divided, the connected link record for the forward link is deleted.

Further, when a new link Lx is connected to a specific node Nx, a connected link record corresponding to a link, forward of the node Nx, in a link row that includes the link Lx is additionally entered in the connected link information for the node Nx.

With the thus explained data structure of the connected link record, a link connected to a node can be changed by performing a simple process, such the deletion or the addition of a connected link record.

Furthermore, since the link row number and the inter-link-row link number for the forward link are stored in the internal connected link record, the location of the link record for a link that is to be connected can be readily obtained.

In addition, since an internal connected link record is not provided for the link preceding the forward link for a node, and since the link connection is represented by using the internal connected link record for the forward link of this node, the size of the road system data can be reduced.

Moreover, since a node-base link number is provided for each node, at the maximum, only about 16 links are connected to the node, and a data size of only about 4 bits is required for the node-base link numbers. Therefore, compared with when information, such as that employed to specify a link using the link row number and the intra-link-row link number, is used to identify all the links in a specific area, the size of the data required for the internally connected link records can be reduced.

Further, since the conventional link rows, and the link row numbers and the intra-link-row link numbers for the links are maintained, regardless of whether a link is discontinued or is established, the conventional internal connection link records need not be changed, even when other link rows or links are discontinued or a new link or a link row is established.

Furthermore, since the node numbers of the conventional nodes are not changed, regardless of whether a node is discontinued or is established, the adjacent connected link record for an adjacent area need not be changed, even when map data for this adjacent area is updated, and the linking to a road system presented by map data for a different edition is enabled without the old road system data being updated. Therefore, when the map data for a segment in a specific area is to be updated, only the data for the desired area segment need be updated; the updating of road system data for the other area segments need not be performed. Thus, continuity between the road systems can be maintained.

The inter-link traffic regulation information consists of an array of fixed length traffic regulation records for the regulation of traffic between links connected to a node.

The locations of the traffic regulation records in the array are called traffic regulation record numbers, and designation of the traffic regulation records is accomplished by using the traffic regulation record numbers.

A traffic regulation record includes a node-base approaching link number, approaching-side preceding link designation information, a node-base exiting link number, exiting-side preceding link designation information, and a traffic regulation code.

The node-base approaching link number and the approaching-side preceding link designation information specify a link that approaches a node. The node-base approaching link number is a node-base link number used to designate an approaching link, and the approaching-side preceding link designation information indicates that, relative to the node-base approaching link number, the approaching link is either a current link or a preceding link.

The node-base exiting link number and the exiting-side preceding link designation information specify a link that exits the node. The node-base exiting link number is a node-base link number used to specify an exiting link, and the exiting-side preceding link designation information indicates that, relative to the node-base exiting link number, the exiting link is either a current link or a preceding link.

The traffic regulation code is a compilation of a variety of traffic regulations, such as a vehicle type regulation and a time regulation for traveling from a link approaching a node to an exiting link.

As is described above, the traffic regulation code employs a node-base link number to designate an approaching link and an exiting link, and since the node-base link number is not affected by the discontinuance of another link or the establishment of a new link, the traffic regulation code need not be changed when another link is discontinued or a new link is established.

FIG. 13 is a diagram showing an example wherein the storage of the node records in FIG. 5 is depicted. In FIG. 13, nodes N0 to N7 are present, and a 0 (existing) is entered as the node state for all the node records.

Since the node N4 is a boundary node and the other nodes are internal nodes, a 1 (a boundary) is entered as the node state for node record #4, and a 0 (internal) is entered as the node state for the other node records.

Further, since it is assumed that there are guidance records corresponding to the nodes N1 and N2, a 1 (yes) is entered as the guidance presence/absence information for node records #1 and #2, and a 0 (no) is entered as the guidance presence/absence information for the other node records.

FIG. 14 is a diagram showing an example wherein the storage of the node addition records in FIG. 5 is depicted.

For node addition record #0 in FIG. 14, the forward link for the node N0 is link L00. Since there is no inter-link traffic regulation, a "1" is entered as the number of connected link records in the node addition header, a "0" is entered as the number of traffic regulation records, and data size nrs0, for node addition record #0, is entered as the node addition record size.

Furthermore, the latitude x0 and the longitude y0 of the node N0 location are entered as node coordinates.

In addition, an internal connected link record C00, indicating link L00, is provided as connected link information. A "0" is entered as a node-base link number, a "00", which is the link row number of the link row 0 to which the link L00 belongs, is entered as a connected link row number, and a "0", which is the intra-link-row link number of the link L00 in the link row 0, is entered as an intra-connected-link-row link number.

Since there is no inter-link traffic regulation, inter-link traffic regulation information is not included.

In the same manner as was done for node addition record #0, data are entered for node addition record #6 for the node N6 in FIG. 14.

For node addition record #3 in FIG. 14, the forward link for the node N3 is the virtual link L02'. Since there is no inter-link traffic regulation present, a "1" is entered as the number of connected link records in the node addition header, a "0" is entered as the number of traffic regulation records, and data size nrs3, for the node addition record #0, is entered as the node addition data size.

Further, the latitude x3 and the longitude y3 of the node N3 location are entered as the node coordinates.

In addition, an internal connected link record C30 indicating the link L02' is provided as connected link information. A "3" is entered as a node-base link number, and a "0", which is the link row number for the link row 0 to which the virtual link L02' belongs, is entered as a connected link row number, and a "3", which is the intra-link-row link number for the virtual link L02' in the link row L0, is entered as an intra-connected-link-row link number.

Since there is no inter-link traffic regulation, inter-link traffic regulation information is not included.

In the same manner as was performed for node addition record #3, data are entered for node addition records #5 and #7 of the nodes N5 and N7 in FIG. 14.

For node addition record #1 in FIG. 14, the forward links for the node N1 are links L01 and L31, and as the inter-link traffic regulations, there are a traffic regulation rc10 for traveling from the link L00 to L30 and a traffic regulation rc11 for traveling from the link L31 to the link L00. Therefore, a "2" is entered as the number of connected link records in the node addition header, and a "2" is entered as the number of traffic regulation records. Data size nrs1, for node addition record #1, is entered as the node addition record size.

Furthermore, the latitude x7 and the longitude y1 of the node N1 location are entered as the node coordinates.

As connected link information for node addition record #1 in FIG. 14, internal connected link record C10, indicating the link L01, and an internal connected link record C11, indicating the link L31, are provided.

As for the internal connected link record C10, a "0", which is the link row number of the link row 0 to which the link L00 belongs, is entered as a connected link row number, and a "1", which is the intra-link-row link number of the link L01 in the link row 0, is entered as an intra-connected-link-row link number. Further, as for the internal connected link record C11, a "3", which is the link row number of the link row 3 to which the link L31 belongs, is entered as a connected link row number, and a "1", which is the intra-link-row link number of the link L31 in the link row 3, is entered as an intra-connected-link-row link number.

For the internal connected link record C10, a "1" is entered as a node-base link number, and for the internal connected link record C11, a "1" is entered as a node-base link number. In this manner, unique node-base link numbers 0 and 1 are provided for the links L01 and L31, which are the forward links for the node N1.

In addition, a traffic regulation record R10, which represents a traffic regulation for traveling from the link L00 to the link L30, and a traffic regulation record R11, which represents a traffic regulation for traveling from the link L31 to the link L00, are provided as the inter-link traffic regulation information in node addition record #1 in FIG. 14.

In the traffic regulation record R10, "0 (=a node-base link number in the internal connected link record C10)", which is the node-base link number for the forward link L01 of the node N1, is entered as a node-base approaching link number, and "1 (=a preceding link)" is entered as an approaching-side preceding link designation. In this manner, the link L00 is identified as the approaching link.

Further, "1 (=a node-base link number in the internal connected link record C11)", which is the node-base link number for the forward link L31 of the node N1, is entered as the node-base exiting link number, and "1 (=a preceding link)" is entered as the approaching-end preceding link designation information. In this manner, the link L30 is identified as the exiting link.

Furthermore, a traffic regulation code rc10 is entered that indicates a traffic regulation for traveling from the link L00 to the link L30.

In the traffic regulation record R11, "1 (=node-base link number in the internal connected link record C11)", which is a node-base link number for the forward link L31 of the node N1, is entered as a node-base approaching link number, and "0 (=a current link)" is entered as the approaching-side preceding link designation information. In this manner, the link L31 is identified as the approaching link.

In addition, "0 (=node-base link number in the internal connected link record C10)", which is the node-base link number for the forward link L0 of the node N1, is entered as the node-base exiting link number, and "1 (=a preceding link)" is entered as the exiting-side preceding link designation information. In this manner, the link L00 is identified as the exiting link.

Moreover, a traffic regulation code rc11 is entered that indicates a traffic regulation for traveling from the link L31 to the link L00.

In the same manner as is performed for node addition record #1, data are entered for node addition record #2 for the node N2 in FIG. 14.

In node addition record #4 in FIG. 14, the node N4 is a boundary node, and the forward link for the node N4 is the link L10. Since there is no inter-link traffic regulation present, a "2" is entered as the number of connected link records in the node addition header, and a "0" is entered as the number of traffic regulation records. Data size nrs4, for node addition record #4, is entered as the node addition record size.

In addition, the latitude x4 and the longitude y4 for the node N4 location are entered as the node coordinates.

Further, an internal connected link record C40 and an adjacent connected link record C41, corresponding to the link L10, are provided as connected link information, and data are entered in the internal connected record C40 in the same manner as is the internal connected link record for node addition record #0.

In the adjacent connected link record C41, since a boundary node NX adjacent to the node N4 belongs to an adjacent area B in the area A, a 2 (below) is entered as adjacent area designation information, and a node number nx, according to the road system data for the area B of the node NX, is entered as an adjacent boundary node number.

Since an inter-link traffic regulation is not present, inter-link traffic regulation information is not entered.

Figure 15:
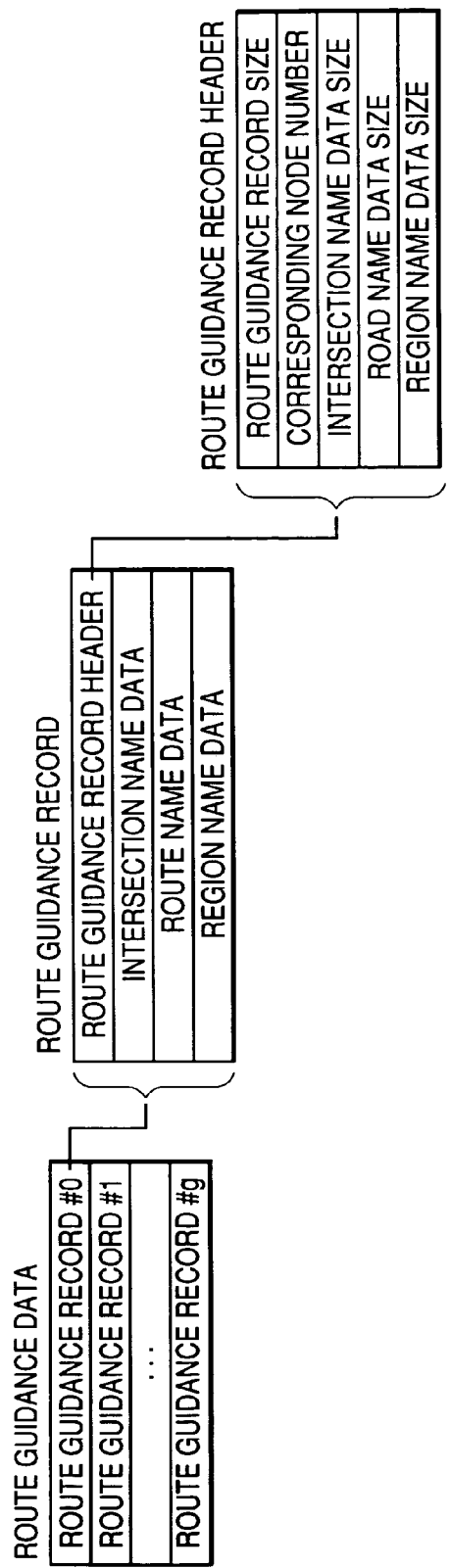
FIG. 15 is a diagram showing an example data structure for route guidance data according to the first embodiment.

FIG. 15 is a diagram showing an example data structure for route guidance data. The route guidance data is the array of route guidance records correlated with nodes. Information, such as the route guidance records, provided in correlation with the nodes is called node associated information.

The locations of the route guidance records in the array are called route guidance record numbers, and the route guidance record numbers are used to identify the route guidance records.

A route guidance record includes various data required for the guidance provided for the nodes, such as a route guidance record header, intersection name data indicating the name of a node intersection, road name data indicating the road name of a link connected to a node, and region name data indicating the destination of a link connected to a node.

The route guidance record header includes a route guidance record size indicating the data size for the route guidance record, the node number of a corresponding node, and data indicating the data sizes for the intersection name data, the road name data and the region name data. That is, the route guidance record, which is node associated information, includes a node number that serves as the node identifier for a corresponding node.

The route guidance records are arranged in the ascending order of the corresponding node numbers, so that a search for a route guidance record can be easily performed by using a node number.

As is described above, the route guidance data is correlated with a node by using a corresponding node number. Therefore, when the route guidance data is updated, e.g., when a route guidance record is deleted or added, or the data size is changed by altering the contents, the road system data is not affected by this data updating. Further, since the node numbers for the conventional nodes are unchanged, regardless of whether a node is discontinued or established, the node numbers corresponding to the conventional route guidance records need not be changed, so that in association with the updating of the road system data, changing the route guidance data is not required.

Figure 16:
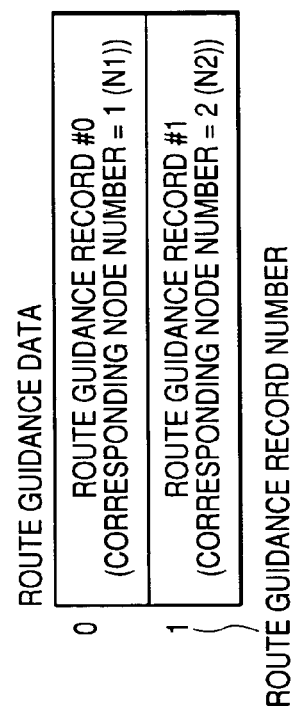
FIG. 16 is a diagram showing a storage example for route guidance data according to the first embodiment.

FIG. 16 is a diagram showing an example wherein route guide data is stored. In FIG. 16, route guidance records #0 and #1 are provided in correlation with the nodes N1 and N2 in FIG. 3, and 1 and 2, which are the node numbers for the nodes N1 and N2, are respectively entered as the node numbers for the route guidance record headers in route guidance records #0 and #1.

Figure 17:
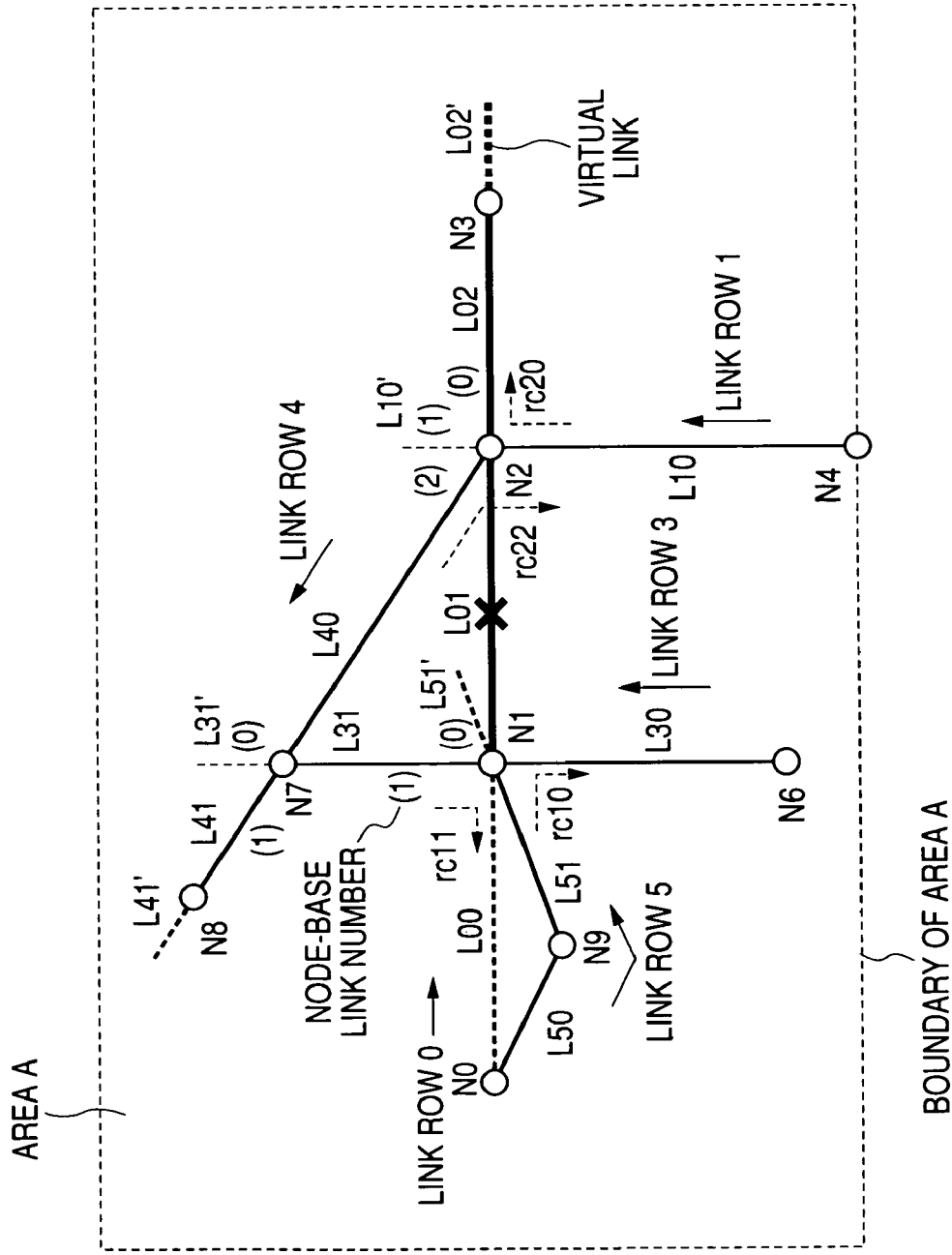
FIG. 17 is a diagram showing a road system obtained by updating performed according to the first embodiment.

FIG. 17 is a diagram showing a road system obtained by updating the road system in FIG. 3. In FIG. 17, the link L01 and the link row 2 are discontinued, and a link row 4, consisting of links L40 and L41, is established; the link L00 is divided to obtain links L50 and L51, and a link row 5 consisting of these links is established; and the node N5 is discontinued and nodes N8 and N9 are established. It should be noted that L41' is a virtual link in the link row 4, and that L51' is a virtual link in the link row 5.

The links L50 and L51, obtained by dividing the link L00, need only be used to replace the link L00, and the road shape represented by the links L50 and L51 does not necessarily match the road shape represented by the link L00. Further, a link to be divided, such as the link L00, is called a before-division link, and link segments obtained by division, such as the links L50 and L51, are called post-divided links.

In FIG. 17, in order to avoid changing the intra-link-row link numbers for the individual links in the link row 0, the link row 5, consisting of the links L50 and L51, is newly provided, instead of replacing the before-division link L00 with the post-divided links L50 and L51, so that the starting node and the end node of the link row 5 are connected to the starting node and the end node of the links L00.

The processing for updating road system data when the road system in FIG. 3 is updated to that in FIG. 17 will now be described.

Figure 18:
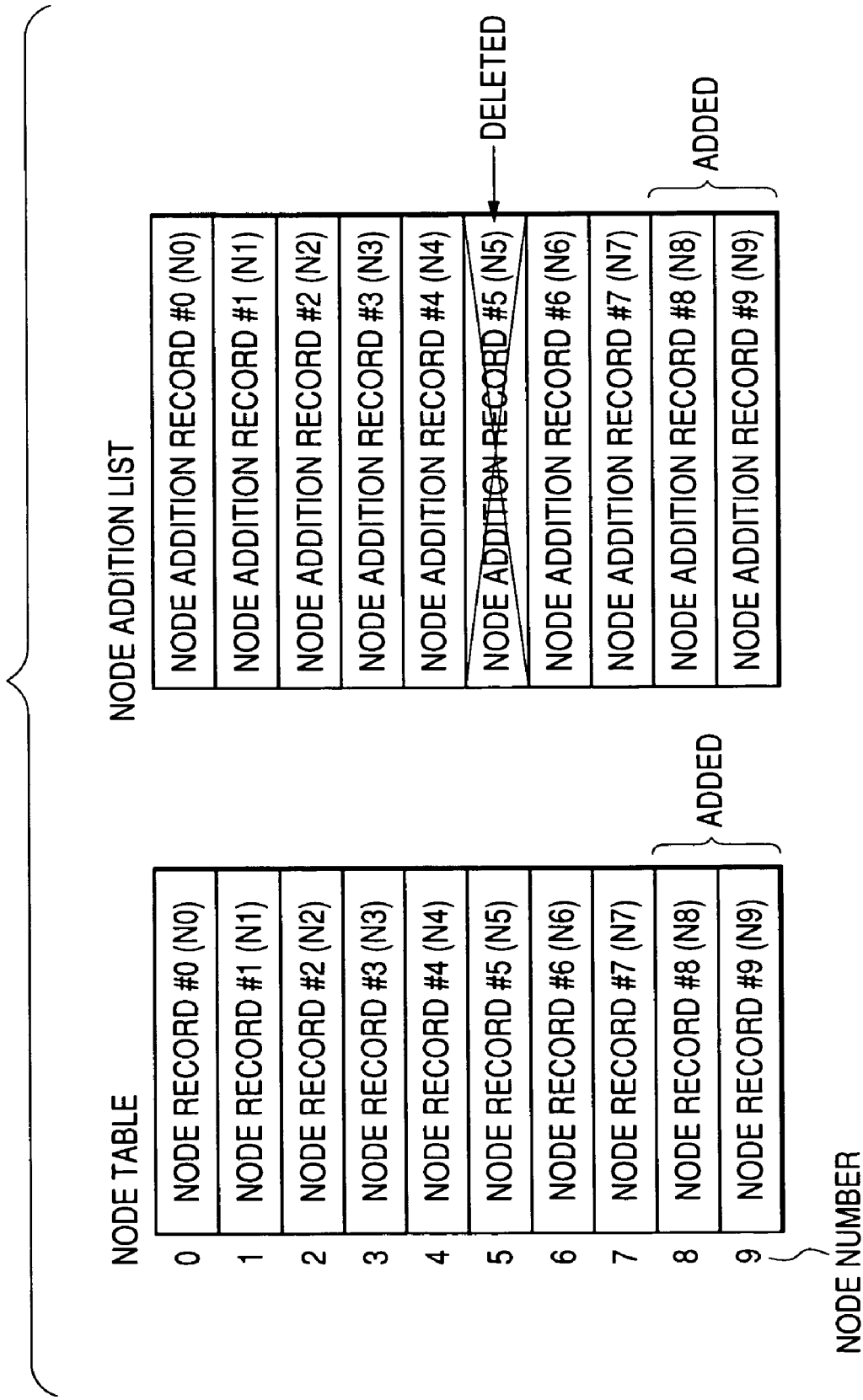
FIG. 18 is a diagram showing data storage examples for a node table and a node addition list obtained by updating performed according to the first embodiment.

FIG. 18 is a diagram showing entry examples obtained by updating the node table and the node addition list in FIG. 5.

In FIG. 18, since new nodes N8 and N9 are established, node records #8 and #9 for the nodes N8 and N9 are entered at the end of the node table.

In the node addition list in FIG. 18, since the node N5 is discontinued, corresponding node addition record #5 is deleted, and since the nodes N8 and N9 are established, for these nodes, node addition records #8 and #9 are entered at the end of the node addition list.

FIG. 19 is a diagram showing examples obtained by updating the link row table and the link row addition list in FIG. 6.

In the link row table in FIG. 19, since new link rows 4 and 5 are established, corresponding link row records #4 and #5 are added at the end of the link row table.

In the link row addition list in FIG. 19, since the link row 2 is discontinued, corresponding link row addition record #2 is deleted, and since new link rows 4 and 5 are established, corresponding link row addition records #4 and #5 are added at the end of the link row addition list.

FIG. 22 is a diagram showing an example wherein node records are stored in the node table in FIG. 18. In FIG. 22, since the node N5 is discontinued, the node state in corresponding node record #5 is changed to 1 (is discontinued), and while assuming that guidance for the node N1 is discontinued, the guidance presence/absence information in node record #1 for the node N1 is changed to 0 (absent). Further, while assuming that a new route guidance record is established for the node N7, the guidance presence/absence information in node record #7 for the node N7 is changed to 1 (present).

FIG. 23 is a diagram showing an example for the storage of node addition records obtained by updating the table in FIG. 14.

In FIG. 23, as is described above, node addition record #5 is deleted, and node addition records #8 and #9 are additionally entered.

In node addition record #0 for the node N0 in FIG. 23, since the link L00 is divided, the connected link record C00 is deleted, and a connected link record C01, indicating the new link L50, is added to the connected link information. In this manner, instead of the link L00, the link L50, obtained by link division, is connected to the node N0.

In node addition record #1 for the node N1, since the link L00 is divided and the link L01 is discontinued, the connected link record C11 is deleted, and thereafter, a connected link record C12, indicating the virtual link L51', is additionally included in the connected link information.

As a result, instead of the link L00, the link L51, obtained by link division, is connected to the node N1, and the link L01 is not connected.

The smallest node-base link number that is not currently used for existing connected link records is provided as the node-base link number for a new connected link record. For the node N1, since only node-base link number 1 is used before the connected link record C12 is added, a "0" is provided as the node-base link number for the connected link record C12.

As a result of the updating, the traffic regulation record R10 is the one for traveling from the link L31 to the link L51, and the traffic regulation record R11 is the one for traveling from the link L51 to the link L30. However, the traffic regulation record is not updated, while it is assumed that the inter-link traffic regulation will be unchanged when the link L00 is replaced by the link L51.

In node addition record #2 for the node N2 in FIG. 23, since the link row 2, i.e., the link L20, is discontinued, the connected link record C22 is deleted, and thereafter, a connected link record C23 indicating a new link L40 is additionally included in the connected link information. As a result, the link L40 is connected to the node N2. It should further be noted that, since node-base link numbers 0 and 1 are used before the connected link record C23 is additionally entered, the smallest number "2", rather than 0 and 1, is stored as the node-base link number in the connected link record C23.

Since the link row 2 is discontinued, the traffic regulation record R21 for traveling from the link L20 to the link L01 is deleted, and a traffic regulation record R22 for traveling from the new link L40 to the link L10 is added to the inter-link traffic regulation information.

Because the link row 2 is discontinued and the link row 4 is established, the node-base link numbers of the conventional links L02 and L01' for the node N2 are not changed when the links connected to the node N2 are changed. Therefore, no change in the conventional traffic regulation record R20 for the node N2 is required.

In node addition record #7 for the node N7 in FIG. 23, a connected link record C71 indicating a new link L41 is added to the connected link information. As a result, the links L40 and L41 are connected to the node N7. It should further be noted that, since node-base link number 0 is employed before the connected link record C71 is added, the smallest number "1", rather than 0, is provided as the node-base link number in the connected link record C71.

Further, the node addition record size in the node addition header is changed to nrs7', which is obtained by adding to nrs7 the size of the connected link record C71.

FIG. 20 is a diagram showing an example wherein link row records are stored in the link row table in FIG. 19. Since the link row 2 is discontinued, the link row state in link row record #2 for the link row 2 is changed to 1 (is discontinued); link row record #4 indicating link row state 0 (existing) and link row type 5 (an ordinary road) is added for a new link row 4; and link row record #5 indicating link row state 0 (existing) and link row type 4 (a prefectural road), which is the same as before the link was divided, is added for a new link row 5.

FIG. 21 is a diagram showing examples obtained by updating the link row addition header and the link table in FIG. 10 for link row addition record #0 in the link row 0.

In FIG. 21, since the link L00 is divided, the link state in link record #0 is changed to 2 (divided), the link addition presence/absence information is changed to 0 (absent), and the link segment number is changed to link row number "5" in the link row 5 consisting of the link segments obtained by dividing the link L00.

As is described above, since the link record for the before-division link L00 is not replaced by the two link records for the links L50 and L51 obtained by the division, the structure of the link records is not affected by the division of the link, and the intra-link-row link numbers for the links L01, L02 and L02' in the link row 0 are not changed.

Furthermore, as is described above, since the link state (divided) and the link row segment number are stored in the link record for the link L00, the location of the link row record for the link row 5, which consists of the link segments obtained by dividing the link L00, can be immediately obtained.

In addition, since the link L01 is discontinued, the link state in link record #1 is changed to 1 (is discontinued), and the link addition presence/absence information is changed to 0 (is absent).

Since the link L00 is discontinued, link addition records #0 and #1 in the link addition list are deleted.

Since the link addition record size in the link row addition header is changed to mlas0', which is obtained by subtracting from mlas0 a size equivalent to that of the link addition records #0 and #1 that have been deleted.

FIG. 24 is a diagram showing an example for the storage of link row addition record #5 in FIG. 21 for the link row 5 that includes the links L50 and L51 obtained by dividing the link L00.

For link row addition record #5 in FIG. 24, data are entered in the same manner as are the individual link row addition records described above. It should be noted that 0 and 255, the smallest and largest link numbers of the before-division link L00, are provided as the smallest and largest link numbers in the link row addition header in FIG. 24. Further, in the link addition list in FIG. 24, 128 is entered as link number information in link addition record #1 for the link L51.

Therefore, the smallest link number value for the link L50 is 0, according to (equation 1), and the largest value is 127, which is obtained by subtracting one from the 128 entered as the link number information for link addition record #1 of the link L51. The smallest value for the link number of the link L51 is 128, which is entered as the link number information for link addition record #1, and the largest value is 255, which is entered as the largest link number in the link row addition header. That is, link numbers 0 to 127 are provided for the link L50, while link numbers 128 to 255 are provided for the link L50.

As is described above, link numbers within a range of 0 to 255 for the before-division link L00 are equally divided, and link numbers within a range of 0 to 127 and within a range of 128 to 255 are respectively provided for the links L50 and L51 obtained by dividing the link L00.

Figure 25:
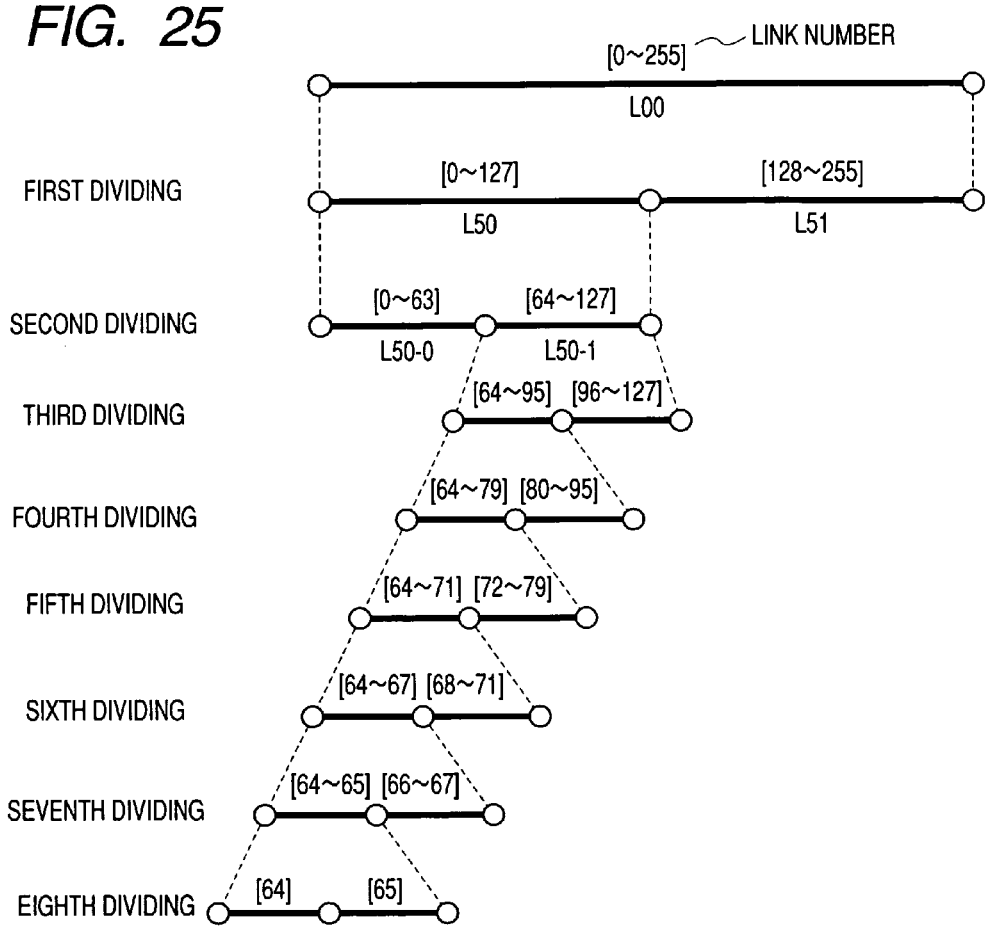
FIG. 25 is a diagram showing an example according to the first embodiment for providing link numbers when a link is divided.

FIG. 25 is a diagram showing an example wherein link numbers are provided when the link L00 is further divided. A link L50 is further divided into links L50-0 and L50-1, and link numbers from 0 to 63 and from 64 to 127, which are obtained by equally dividing link numbers from 0 to 127 provided for the link L50, are distributed to the links L50-0 and L50-1. In the same manner, each time a link is divided, the link numbers previously provided for the link are equally divided and distributed to the link segments obtained by division. It is understood that the link L00 can be divided eight times.

Since the constant designated for the link numbers is 256, the other links shown in FIG. 3 can also be divided eight times.

Since the link numbers are provided for the link segments obtained by the division performed in this manner, division a predetermined number of times is enabled for all the links.

In this embodiment, the constant designated for the link numbers is 256. Thus, when a constant of 257 is designated for the link numbers and the link numbers from 0 to 256 are divided equally, link numbers from 0 to 127.5 and from 127.5 to 256 are provided. However, since link numbers are integers, the decimal part of the numbers for the upper limit and lower limit ranges are respectively discarded and the numbers are rounded off to avoid the overlapping of the ranges, and the link numbers that are thus obtained, from 0 to 127 and from 128 to 256, are distributed. Therefore, the link numbers to be distributed to the link segments obtained by division need only be defined in accordance with the ranges that are obtained by equally dividing the constant 257 in the above described manner.

Figure 26:
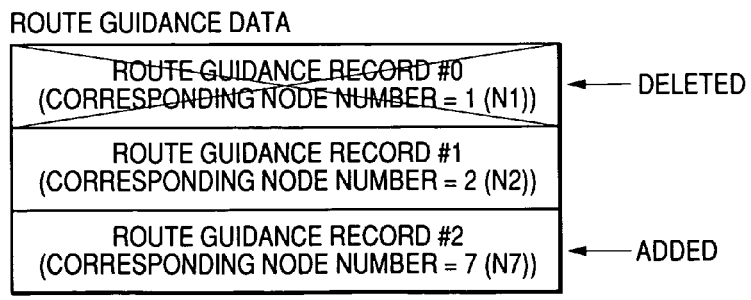
FIG. 26 is a diagram showing example route guidance data obtained by updating performed according to the first embodiment.

FIG. 26 is a diagram showing an example obtained by updating the route guidance data in FIG. 16.

The route guidance data shown in FIG. 26 are those obtained when route guidance for the node N1 is discontinued and new route guidance for the node N7 is established. That is, route guidance record #0 for the node N1 is discontinued, route guidance record #2 for the node N7 is added, and node number 7 for the node N7 is entered as a node number corresponding to route guidance record #2.

Since the above described data structures are provided for the node records and the node addition records, the storage location for a node record in the node table can be obtained as a product of the node number and the size of the data for the node record. Furthermore, the storage location for a node addition record in the node addition list depends on the node state, and can be obtained by a simple calculation, i.e., by sequentially adding the individual node addition record sizes beginning at the head of the node addition list. For example, in FIG. 23, a storage location Aq (q=1, 2, . . . , 9) for node addition record #q (q=0, 1, 2, . . . , 9) can be obtained by sequentially calculating A0=0, A1=A0+nrs0, A2=A1+nrs1, A3=A2+nrs2, A4=A3+nrs3, A5=A4+nrs4, A6=A5, A7=A6+nrs6, A8=A7+nrs7', and A9=A8+nrs8. Since the node N5 has been discontinued and no node state is present, the storage location A6 for node addition record #6 of the node N6 is obtained as A6=A5 while the node addition record size of the node N5 is regarded as 0. Before road system data are employed the first time, the storage locations for the individual node addition records need only be obtained in the above described manner, and stored in a node addition record storage location table as A0, A1, A2, A3, A4, A5, A6, A7, A8 and A9 in the node number order. Thus, the storage location for a node addition record corresponding to a desired node number can be readily obtained by referring to the node addition record storage location table. As is described above, when the node number is used as a node identifier, the node data for a desired node can be quickly obtained by using the node identifier.

In accordance with the first embodiment of the invention, an explanation will now be given for the data structure of map update information used for updating map data.

Figure 27:
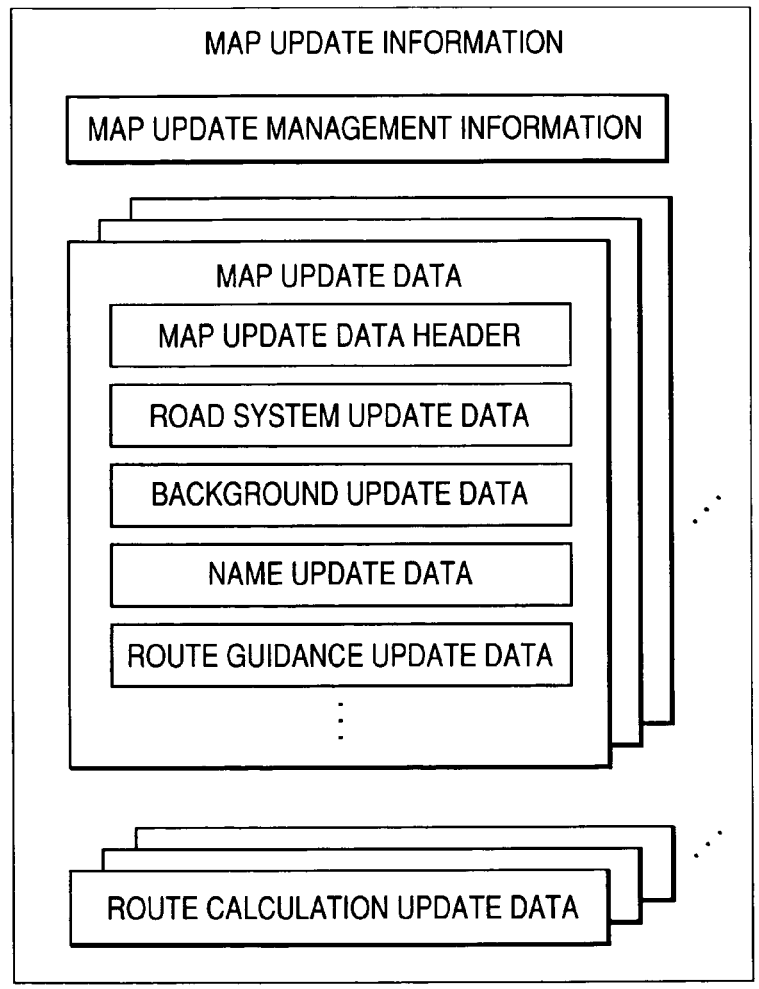
FIG. 27 is a schematic diagram showing the data structure of map update information stored on an update DVD-ROM according to the first embodiment.

FIG. 27 is a schematic diagram showing the data structure of map update information stored in an update DVD-ROM loaded to the update data acquisition device 4. In FIG. 27, the map update information includes map update management information, one or more sets of map update data and route calculation update data.

The map update management information is data used to manage the update data for the individual levels, and includes, for each level, information correlating the individual areas with the map update data and the route calculation update data, the storage locations of the map update data and the route calculation update data in the map update information, and the data sizes for these data.

The map update management information also includes data identification information indicating that map update information is stored on the currently loaded DVD-ROM, update edition information indicating the edition of the map information to be used for updating the map information, and update edition information indicating the edition of the map information obtained by using the map update information.

The map update data are used to update map data, and are provided in correlation with map data. Map update data corresponding to map data for which updating is not required are not stored. The route calculation update data are those used to update route calculation data, and are provided in correlation with the route calculation data. Route calculation update data are not stored for route calculation data for which updating is not required.

The map update data includes road system update data, background update data, name update data and route guidance update data, which are used to update the road system data, the background data, the name data and the route guidance data, and a map update header. It should be noted that update data are not stored for data for which updating is not required. The update data consist of one or more update records.

The map update data header is data used to manage the update data, and includes the storage locations for the update data in the map data, the data sizes used for the update data and the number of update records.

Figure 28:
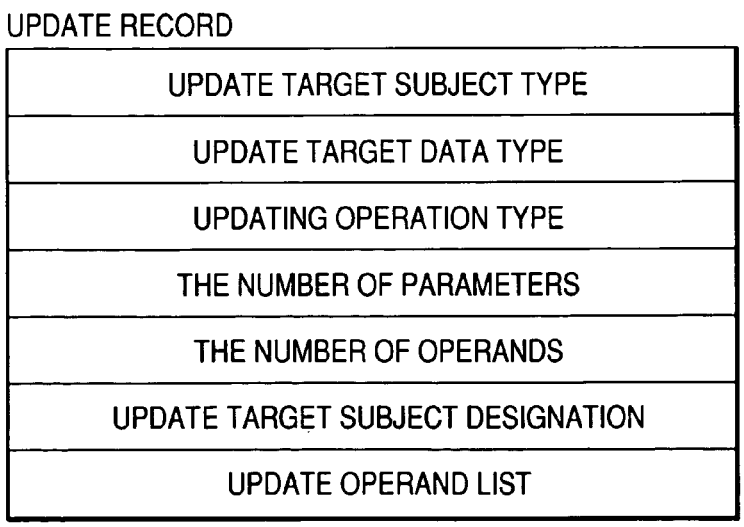
FIG. 28 is a diagram showing an example data structure for update records according to the first embodiment.

FIG. 28 is a diagram showing an example data structure for an update record. In FIG. 28, the update record includes a subject type to be updated, a data type to be updated, an update operation type, the number of parameters, the number of operands, subject designation information, and an update operand list.

The subject type to be updated indicates the type of geographical subject to be updated, such as no designation (0), a node (1), a link (2) or a link row (3). The data type to be updated is the type of data that constitutes the road system data. The update operation type indicates the type of operation employed to update a geographical subject, such as discontinuing (0), establishing (1) or dividing (2) a link, or the type of data updating operation, such as overwriting (10), deleting (11), replacing (12) or adding (13). The number of parameters indicates the number of parameters included in the subject designation information, and the number of operands indicates the number of update operands. The subject designation information designates an update target subject, such as a node number, based on the parameters, and a link row number and an intra-link-row link number. The update operand list is data used for updating a node record and a node addition record. And the data stored as the subject designation information and the update operand list are defined in accordance with the subject type to be updated, the data type to be updated and the update operation type.

The data type to be updated can be defined as data concerning a node, such as a node record (10), a node state (11), boundary information (12), guidance presence/absence information (13), a node addition record (100), a node addition header (110), node coordinates (120), connected link information (130), inter-link traffic regulation information (140) or a traffic regulation record (141).

The values in parentheses are those to be stored in the update record.

In order to easily delete a connected link record, update records concerned with the updating of links are arranged in the ascending order of the link rows in which the links belong, and update records concerned with the updating of the links that belong in the same link row are arranged in the ascending order of the intra-link-row link numbers.

Further, when a new link row is established, a new link row record and a new link row addition record can be employed to prepare a connected link record for a new link, and the smallest node-base link number not yet used for conventional connected link records can be provided as the node-base link number for the new link. Therefore, an update record for establishing a link row should be located following an update record indicating the establishment of a node, the discontinuance of a link, the division of a link or the discontinuance of a link row.

FIG. 29 is a diagram showing an example wherein road system update data for updating the road system in FIG. 3 to the road system in FIG. 17 are stored. In FIG. 29, update record #r0 depicts the overwriting of route presence/absence information in a link record for a node (node N1) having node number 1, and in the update operand list, guidance information (=0 (absent)) is included as data to be used for the overwriting the update operand list.

Update record #r1 depicts the deletion of a traffic regulation record R21 for which a "1" is entered as the traffic regulation record number of the inter-link traffic regulation information for a node (node N2) having node number 2.

Update record #r2 depicts the addition of a traffic regulation record to the inter-link traffic regulation information for the node (node N2) having node number 2, and in the update operand list, the traffic regulation record R22 shown in FIG. 23 is included as data to be added.

Update record #r3 depicts the discontinuance of the node N5 having node number 5. Update record #r4 depicts the establishment of a new node, and in the update operand list, node record #8 and node addition record #8 shown in FIG. 18 are included as data to be added for the establishment of the new node. Update record #r5 depicts the establishment of a new node, and in the update operand list, node record #9 and node addition record #9 shown in FIG. 18 are included as data to be added for the establishment of the new node.

Update record #r6 depicts the division of the link L00, which has intra-link-row link number 0 and belongs to the link row 0 having link row number 0, and included in the update operand list are data designating the link row 5, i.e., data indicating that the link row number of the link row segment is 5. Update record #7 depicts the discontinuance of the link L01, which has intra-link-row link number 1 and belongs to the link row 0 having link row number 0.

Update record #r8 depicts the discontinuance of the link row 2 having link row number 2. Update record #r9 depicts the establishment of a new link row, and in the update operand list, link row record #4 and link row addition record #4 shown in FIG. 19 are included as data to be added for the establishment of the new link row. Update record #r10 depicts the establishment of a new link row, and in the update operand list, link row record #5 and link row addition record #5 shown in FIG. 19 are included as data to be added for the establishment of the new link row.

FIG. 30 is a diagram showing a storage example for the rouge guidance update data used for updating the route guidance data in FIG. 16 to the route guidance data in FIG. 25. In FIG. 30, update record #g0 depicts the deletion of route guidance record #0 having route guidance record number 0. Update record #g1 depicts the addition of a route guidance record, and includes, as an update operand, route guidance record #2 shown in FIG. 25, which is data to be added to establish a new route guidance record.

FIG. 31 is a flowchart showing the operation of the map data processing apparatus shown in FIG. 1. While referring to the flowchart in FIG. 31, the operation of the map data processing apparatus in FIG. 1 will be described based on an example for the updating of the road system in FIG. 3 to the road system in FIG. 17.

Figure 32:
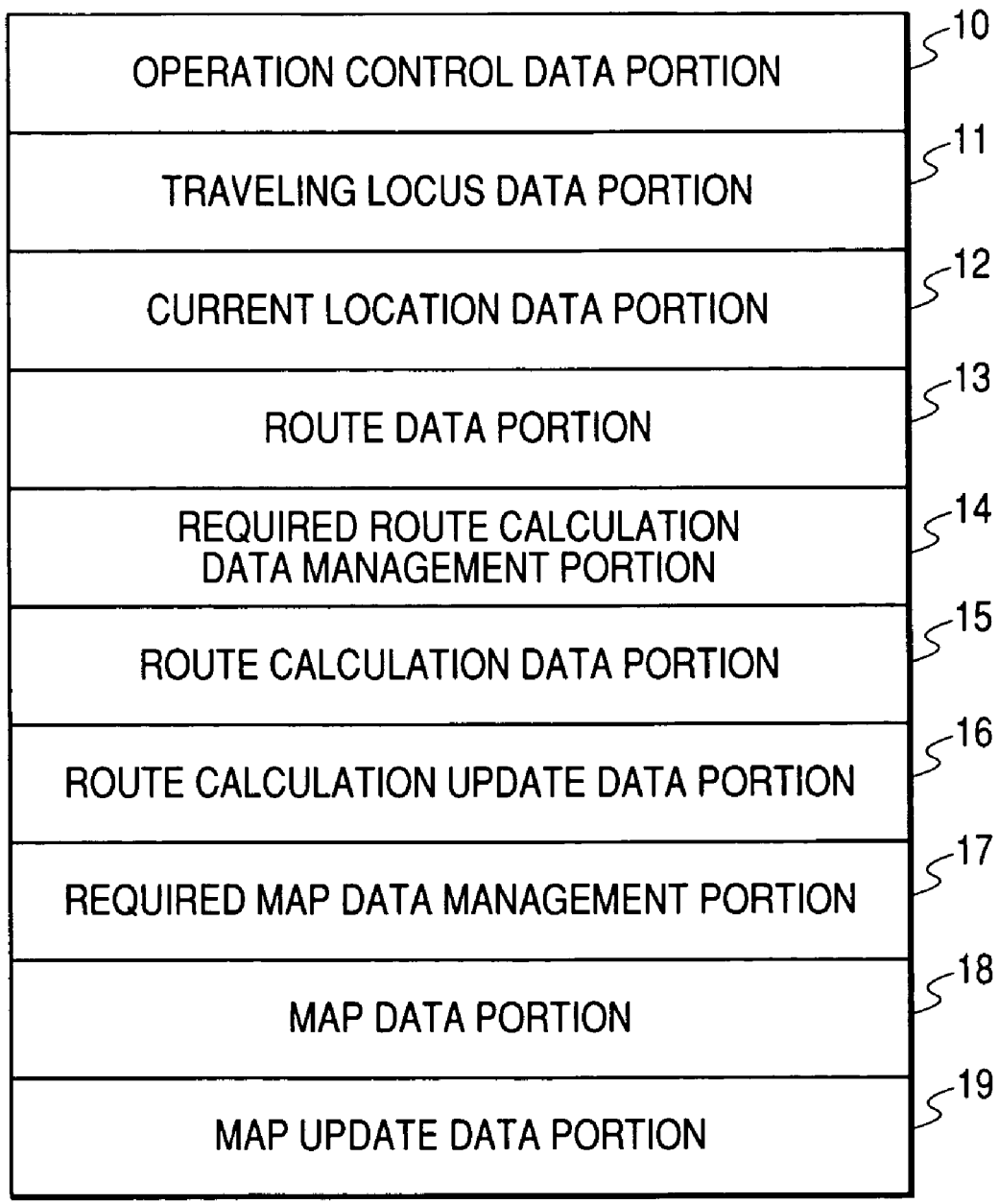
FIG. 32 is a diagram showing the allocation in the memory of a processor 5 according to the first embodiment.

For this operation, as is shown in FIG. 32, the processor 5 memory is allocated for the following data portions: an operation control data portion 10, for the storage of data for controlling the operation of the map data processing apparatus; a traveling locus data portion 11, for the storage of traveling locus data that is a time series of position information obtained by the position detector 2; a current location data portion 12, for the storage of data representing the current location of a vehicle; a route data portion 13, for the storage of route data representing a route from a starting point to a destination; a required route calculation data management portion 14, for the storage of required route calculation management data; a route calculation data portion 15, for the storage of route calculation data; a route calculation update data portion 16, for the storage of route calculation update data; a required map data management portion 17, for the storage of required map management data; a map data portion 18, for the storage of map data; and a map update data portion 19, for the storage of map update data.

When the map data processing apparatus is activated and begins the processing, at first, at step ST10, the processor 5 memory is initialized and program control advances to step ST11.

At step ST11, whether an update DVD-ROM has been inserted into the update data acquisition device 4 is determined. When an update DVD-ROM has been inserted, program control advances to step ST12. When an update DVD-ROM has not been inserted, program control is shifted to step ST13.

At step ST12, the map update management information included in the map update information is read from the update DVD-ROM inserted into the update data acquisition device 4, and the update target edition information included in the map update management information is compared with the edition information included in the map management information for the map data that is stored in the map data storage device 3. When the information matches, it is assumed that using the map update information to update the map data is enabled, and the map update information is read and stored in the map data storage device 3. Program control thereafter moves to step ST13.

At step ST13, based on an instruction signal, transmitted by the input device 1, representing a user manipulation or instruction, data is stored in the operation control data portion 10 to control the operation of the map data processing apparatus, e.g., to designate a display scale for a map and a destination or to begin the calculation of a route. Program control then advances to step ST14.

At step ST14, position information is obtained from the position detector 2, and cumulatively stored in the traveling locus data portion 11. Further, the position information first obtained at step ST14 is stored as the current location in the current location data portion 12. Program control then advances to step ST15.

At step ST15, processing is performed to determine whether the operation control data portion 10 indicates the start of route calculation has been designated. When the start of route calculation has been designated, program control advances to step ST16. When the start of route calculation has not been designated, program control moves to step ST18.

At step ST16, the location designated in the current location data portion 12 is defined as a starting point and is stored in the operation control data portion 10. Then, in order to obtain an appropriate route from the starting point, stored in the operation control data portion 10, to a destination, route calculation data for the route calculation is obtained and updated. Thereafter, program control advances to step ST17.

At step ST17, to acquire an appropriate route from the starting point to the destination, the route calculation data obtained and updated at step ST16 is used to perform the route calculation. Then, the obtained route data representing the appropriate route are stored in the route data portion 13, and the route calculation start instruction, stored in the operation control data portion 10, is canceled. Program control is then shifted to step ST18.

Figures 33, 34:
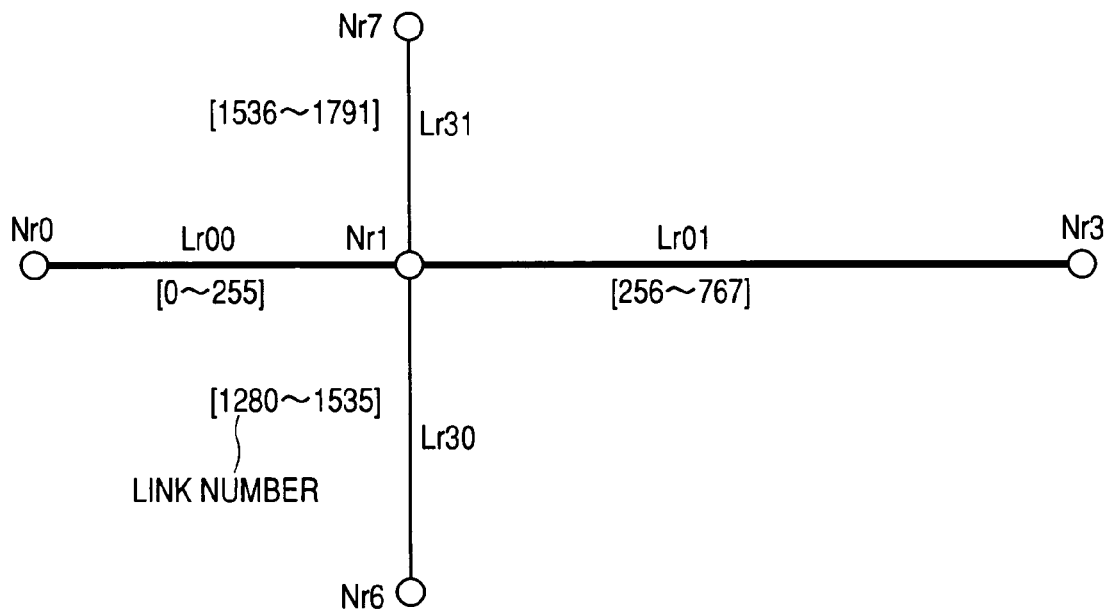
FIG. 33 is a diagram showing an example road system represented by route calculation data according to the first embodiment.
FIG. 34 is a diagram showing example route data according to the first embodiment.

FIG. 33 is a diagram showing an example road system represented by the route calculation data for the area A in FIG. 3.

In the road system shown in FIG. 33, nodes Nr0, Nr1, Nr3, Nr6 and Nr7 correspond to the nodes N0, N1, N3, N6 and N7 in FIG. 3.

Links Lr00, Lr30 and Lr31 in FIG. 33 correspond to the links L00, L30 and L31 in FIG. 3, and link numbers 0 to 255, 1280 to 1535 and 1536 to 1791, for the corresponding links in FIG. 3, are provided. It should be noted that the link Lr01 is obtained by coupling the links L01 and L02 in FIG. 3, and that link numbers from 256 to 767, which are obtained by connecting the link numbers 256 to 511 and 512 to 767 together, are provided.

FIG. 34 is a diagram showing example route data obtained at step ST17 that represents a route formed of the links Lr00 and Lr30, which are obtained when the starting point is the node NrO in FIG. 33 and the destination is the node Nr6 in FIG. 33. This route corresponds to the one that includes the links L00 and L30 in FIG. 3.

The route data includes a link count indicating the number of links constituting a route, and route records provided for corresponding links constituting the route. Each route record includes the smallest and largest values provided for the link numbers of the links for corresponding road system data, and the direction of the route relative to the links represented by the link numbers. In the route record, a forward direction (0) is entered when the direction of the route matches the direction of links correlated with the link numbers, or a reverse direction (1) is entered when the direction of the route is the opposite.

At step ST18, map data are obtained that are required to display a map near the current location stored in the current location data portion 12, and to perform map matching and provide route guidance. The obtained map data are stored in the map data portion 18 and are updated thereafter. Program control then advances to step ST19.

At step ST19, based on the traveling locus data in the traveling locus data portion 11 and the road system data for the map data in the map data portion 18, a link along which the vehicle is traveling and the position of the vehicle along the link are estimated to obtain the current location of the vehicle. The current location is stored in the current location data portion 12, and thereafter, program control advances to step ST20.

The link along which the vehicle is currently traveling and the position of the vehicle along the link are estimated based on the relationship between the traveling locus data and the shape of the link or the series of links. In addition, to increase the accuracy of the link estimate, the connected link information, the inter-link traffic regulation information and the one-way information are also employed for the estimate.

In this processing, the coordinate values for the starting node of the link are obtained from the node coordinates that are stored in the node addition record corresponding to the starting node number in the link record. The coordinate values for the interpolation point on the link are obtained from the link shape information in the link record. The coordinate values for the end node of the link are obtained from the node coordinates that are stored in the node addition record corresponding to the starting node number in the link record for the succeeding link. As a result, coordinate values indicating the shape of the link can be acquired.

When a link cannot be specified, the latest position information in the traveling locus data portion 11 is stored as the current location in the current location data portion 12.

At step ST20, a map screen is displayed by the output device 6. On the map screen, according to the display scale designated in the operation control data portion 10, roads, a background and names are drawn in accordance with the road system data, the background data and the name data that are included in the map data stored in the map data in the map data portion 18. Program control then advances to step ST21.

To draw roads based on the road system data, the colors and the widths of roads are determined in accordance with the link row type included in the link row record. With these colors and widths, the roads are drawn by using zigzag lines in consonance with the node coordinates, which are obtained from the node addition record for a corresponding starting node number in the link record, and the link shape information, which is obtained from the link addition record.

At step ST21, a figure representing the current location is displayed at a position, on the map screen displayed at step ST20, corresponding to the current location stored in the current location data portion 12. Thereafter, program control advances to step ST22.

At step ST22, a route is enhanced and presented on the map screen displayed at step ST20, so that this route can be identified as a route designated by the route data obtained at step ST17. Program control then advances to step ST23.

At step ST23, the route guidance presence/absence information in the node record is searched for in the preceding node record for the link, obtained at step ST19, along which the vehicle is currently traveling. When a corresponding route guidance record is present, a guidance screen and oral guidance for this node are provided by the output device 6 based on the route guidance record in the route guidance data.

Assuming that the vehicle is currently traveling along the link L00 to the node N1 in FIG. 3, the presence of a route guide record is found by referring to the route guidance presence/absence information in node record #1 for the route data in FIG. 34 for the node N1 in FIG. 13. Then, the route guidance data in FIG. 16 is examined by employing, as a key, the node number for the node N1, and route guidance record #0 is found, the node number of which matches node number 1 of the node N1. Based on route guidance record #0, the guidance screen and oral guidance are provided by the output device 6.

Thereafter, program control returns to step ST11 and the processes at steps ST11 to ST23 are repeated.

In this manner, the map data processing, such as map display, map matching, route calculation and route guidance, is performed by using the map data that are updated by using the map update data stored in the update DVD-ROM.

Figure 35:
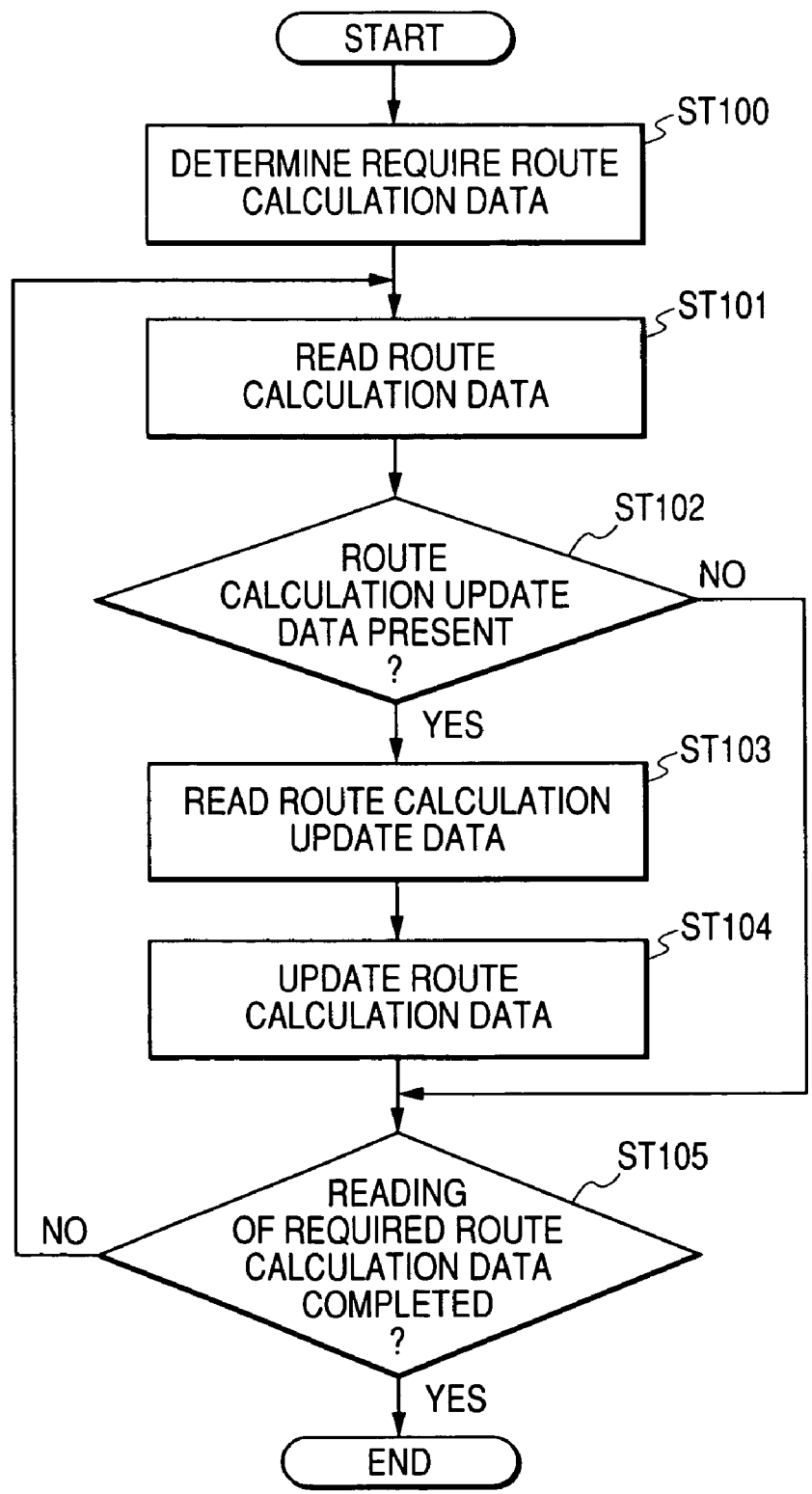
FIG. 35 is a detailed flowchart showing the processing for obtaining and updating route calculation data according to the first embodiment.

FIG. 35 is a detailed flowchart showing the process performed at step ST16 in FIG. 31 to obtain and update route calculation data. At step ST100, required levels and areas for route calculation data sets are obtained for use in calculations performed to select an appropriate route from a starting point to a destination indicated in the operation control data portion 10. Once obtained, the levels and areas are stored as required route calculation management data in the required route calculation data management portion 14. Program control then advances to step ST101.

At step ST101, route calculation data, designated by the required route calculation management data stored in the required route calculation data management portion 14, are read from the map information stored in the map data storage device 3 and are stored in the route calculation data portion 15. Thereafter, program control advances to step ST102.

At step ST102, if map update information is not stored in the map data storage device 3, program control is shifted to step ST105. However, when map update information is stored in the map data storage device 3, map update management information included in the map update information is employed to determine whether route calculation update data are available for the same level and the same area as those obtained for the route calculation data at step ST101. If such route calculation update data are not found, program control is also shifted to step ST105. But when the route calculation update data are available, program control advances to step ST103.

At step ST103, route calculation update data, for the same level and the same area as those obtained at step ST101 for the route calculation data included in the map update information, are read from the route calculation update data stored in the map data storage device 3. Thereafter, the route calculation update data are stored in the route calculation update data portion 16 and program control advances to step ST104.

At step ST104, the route calculation data obtained from the route calculation data portion 15 at step ST103 are updated by using the route calculation update data obtained from the route calculation update data portion 16 at step ST104. Program control then advances to step ST105.

At step ST105, a check is performed to determine whether all the required route calculation data, designated in the route calculation management data stored in the required route calculation data management portion 14, have been read. When all the data have been read, the process for obtaining and updating the route calculation data is terminated. When all the data have not been read, program control returns to step ST101 and the processes at steps ST101 to ST105 are repeated.

Figure 36:
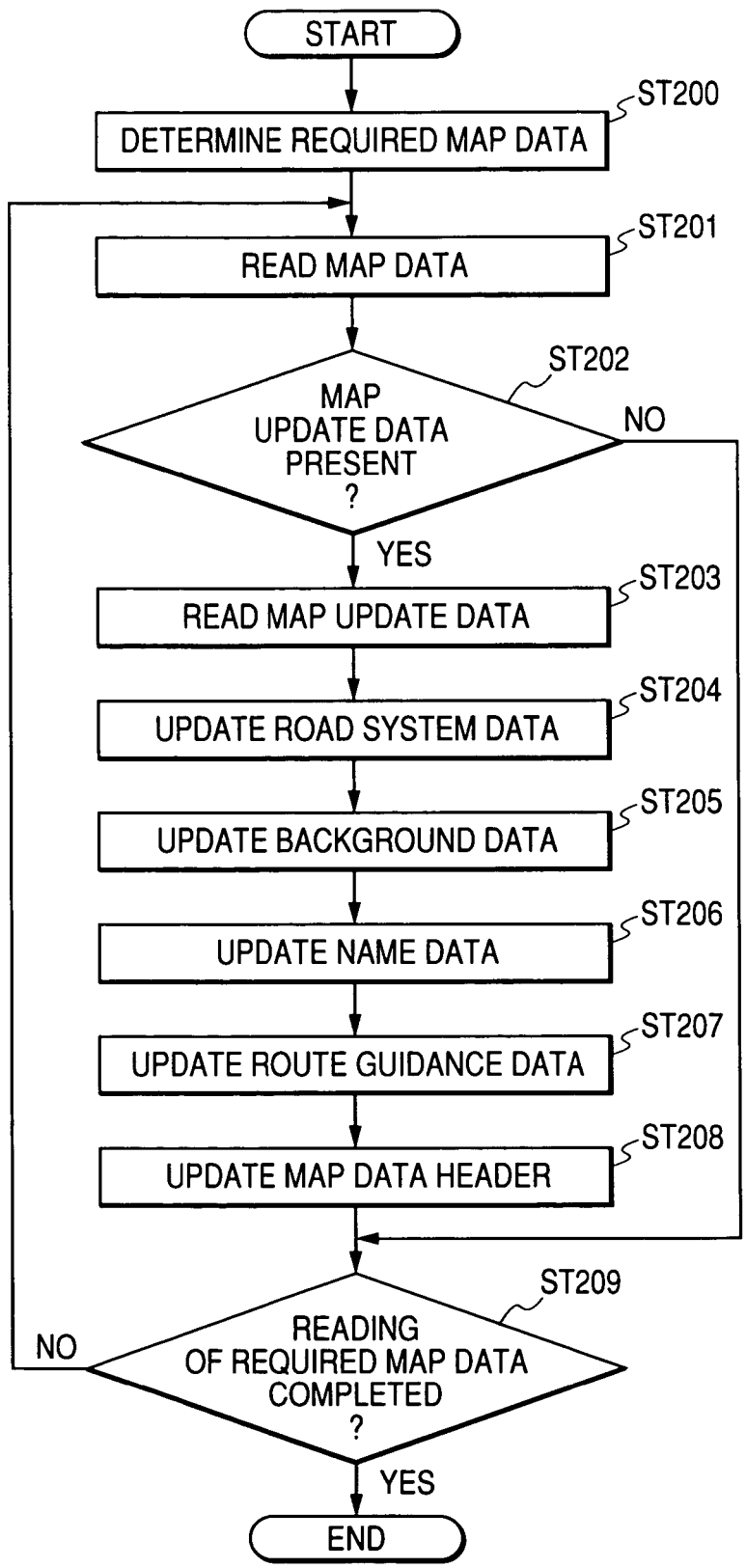
FIG. 36 is a detailed flowchart showing the processing for obtaining and updating map data according to the first embodiment.

FIG. 36 is a detailed flowchart showing the process performed at step ST18 in FIG. 31 to obtain and update map data. At step ST200, the levels and areas for individual map data sets are obtained that are required for the display of a map near the current location indicated in the current location data portion 12 and for the performance of map matching and route guidance. The levels and areas that are obtained are stored as required map management data in the required map data management portion 17. Program control then moves to step ST201.

At step ST201, map data designated by the required map management data stored in the required map data management portion 17 are read from the map information stored in the map data storage device 3 and stored in the map data portion 18. Program control then advances to step ST202.

At step ST202, when no map update information is stored in the map data storage device 3, program control is shifted to step ST209. Whereas when map update information is stored in the map data storage device 3, the map update management information included in this map update information is employed to determine whether map update data is available for the same level and same area as those for the map data obtained at step ST201. If such map update data are not found, program control is shifted to step ST209. Whereas if the map update data are found, program control advances to step ST203.

At step ST203, the map update data for the same level and same area as those for the map data obtained at step ST201 are read from the map update information stored in the map data storage device 3 and stored in the map update data portion 19. Program control then advances to step ST204.

At step ST204, the road system data in the map data obtained from the map data portion 18 at step ST201 are updated by using the road system update data included in the map update data obtained from the map update portion 19 at step ST203. Program control then moves to step ST205.

At step ST205, background data in the map data obtained from the map data portion 18 at step ST201 are updated by using the background update data included in the map update data obtained from the map update portion 19 at step ST203. Thereafter, program control advances to step ST206.

At step ST206, name data in the map data obtained from the map data portion 18 at step ST201 is updated by using the name update data included in the map update data obtained from the map update data portion 19 at step ST203. Program control then advances to step ST207.

At step ST207, route guidance data in the map data obtained from the map data portion 18 at step ST201 are updated by using the route guidance update data included in the map update data obtained from the map update data portion 19 at step ST203.

By referring to update record #g0 in the route guidance update data in FIG. 30, route guidance record #0 is deleted from the route guidance data in FIG. 16, and route guidance record #2 in the update operand list for update record #g1 is added to the route guidance data in FIG. 16. As a result, the route guidance data in FIG. 16 is updated to the route guidance data shown in FIG. 26.

During this updating process, a node corresponding to a conventional route guidance record, such as route guidance record #1 in FIG. 26, is not changed. Therefore, the updating of the route guidance data does not affect the road system data, i.e., the road system data is unchanged.

Following this process, program control advances to step ST208.

At step ST208, the map data header of the map data is updated in consonance with the updating of the road system data, the background data, the name data and the route guidance data, and program control advances to step ST209.

At step ST209, a check is performed to determine whether all the map data indicated by the map management data stored in the required map data management portion 17 have been read. When all the map data have been read, the process for obtaining and updating the map data is terminated. When not all the map data have been read, program control returns to step ST201 and the processes at steps ST201 to ST209 are repeated.

Figure 37:
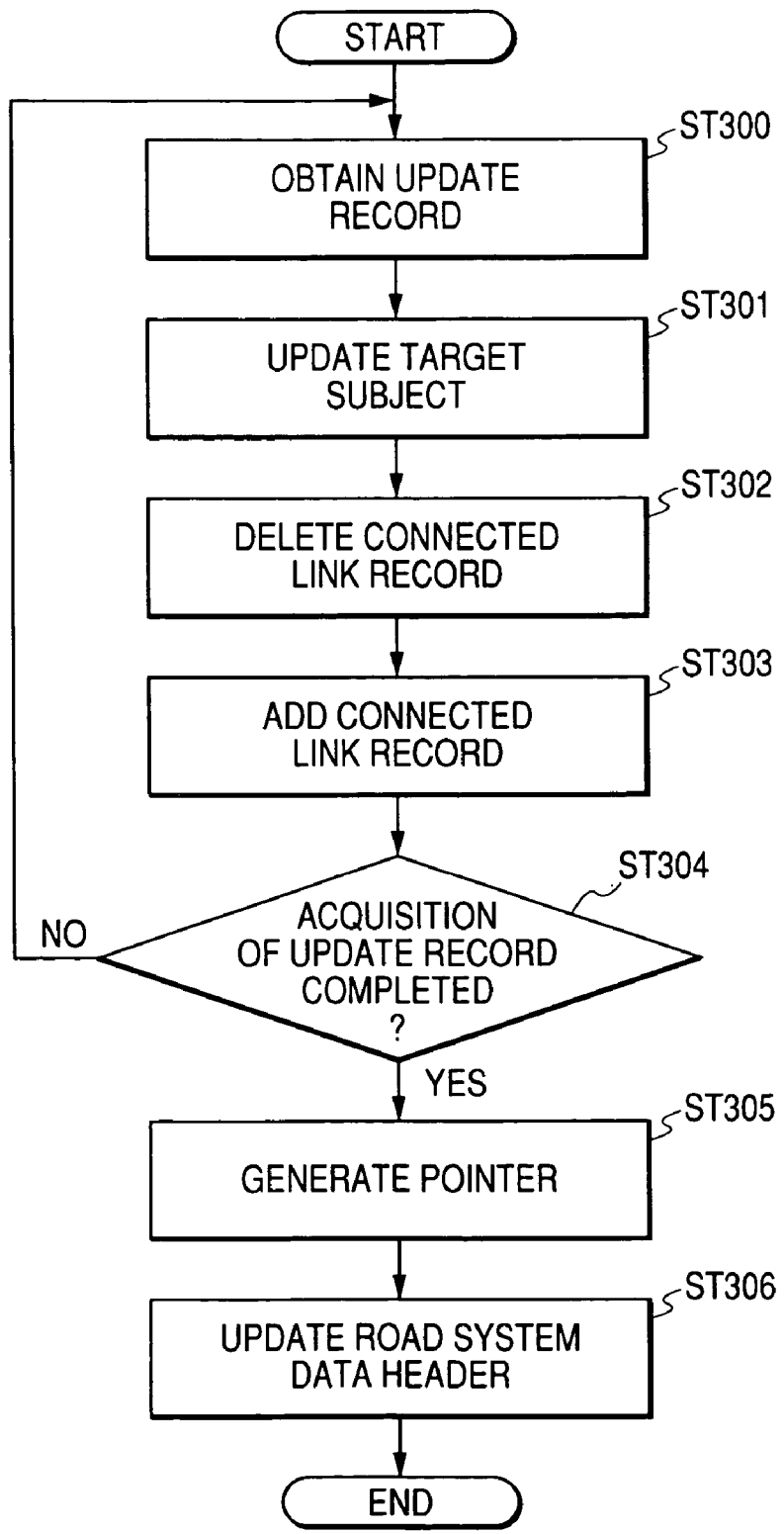
FIG. 37 is a detailed flowchart showing the processing for updating road system data according to the first embodiment.

FIG. 37 is a detailed flowchart showing the process at step ST204 in FIG. 36 for updating the road system data. At step ST300, an update record is obtained from the road system update data included in the map update data obtained from the map update data portion 18 at step ST203. Program control then advances to step ST301.

At step ST301, a part of the road system data, which is defined by the subject type, the data type and the subject designation information included in the update record obtained at step ST300, is updated in accordance with the update operation type, and by using the data in the update operand list. As this updating is being performed, the node addition header, the link row addition header and the link addition header are also updated. In the following explanation, the updating of the node addition header, the link row addition header and the link addition header will not be explained; however, these headers are appropriately updated in accordance with the updating contents.

In the road system update data shown in FIG. 29 for update record #r0, the guidance presence/absence information (=0 (absent)) in the update operand list is overwritten with the guidance presence/absence information in the node record #1 in FIG. 13 for the node N1 having the node number "1". The resultant data is used as node record #1 shown in FIG. 22.

For update record #r1, the traffic regulation record R21 having traffic regulation record number "1" is deleted from the inter-link traffic regulation information in the node addition record #2 in FIG. 14 for the node N2 having the node number "2". As this deletion is being performed, the node addition record size and the number of traffic regulation records designated in the node addition record header are changed.

Further, for update record #r2, the traffic regulation record R22 in the update operand list is added to the inter-link traffic regulation information in the node addition record #2 in FIG. 14.

In this manner, in accordance with update records #r1 and #r2, the inter-link traffic regulation information is updated as is shown in node addition record #2 in FIG. 23.

For update record #r3, the node state in node record #5 in FIG. 13 for the node N5 having the node number "5" is changed to "1 (discontinued)", and node addition record #5 for the node N5 in FIG. 5 is deleted.

For update records #r4 and #r5, node records #8 and #9 in the update operand list are added to the end of the node table in FIG. 5, and node addition records #8 and #9 in the update operand list are added to the end of the node addition list in FIG. 5.

In this manner, the node table in FIG. 18, the node record in FIG. 22, the node addition list in FIG. 18 and node addition records #8 and #9 in FIG. 23 are obtained in accordance with update records #r3, #r4 and #r5. It should be noted, however, that at this time, connected link records C80 and C90 have not yet been entered in node addition records #8 and #9.

For update record #r6, "2 (divided)" is set as the link state for link record #0, of the link L00, that has the intra-link-row link number "0" for the link row 0 that has the link row number "0" shown in FIG. 10. Further, "5" is set as the link segment number in the update operand list, the link presence/absence information is changed to "0 (absent)", and the link addition record #0 for the link L00 in FIG. 10 is deleted.

For update record #r7, "0 (discontinued)" is set as the link state in link record #1, for the link L01, that has the intra-link-row link number "1" for the link row 0 that has the link row number "0" in FIG. 10. In addition, the link addition presence/absence information is changed to "0 (absent)", and link addition record #1 for the link L01 in FIG. 10 is deleted.

In this manner, in accordance with update records #r6 and #r7, the link addition record for the link row 0 is updated to the link addition record shown in FIG. 21.

For update record #r8, "0 (discontinued)" is set as the link row state in link record #2 for the link row 2 having the link row number "2" in FIG. 9, and link row addition record #2 for the link row 2 in FIG. 6 is deleted.

For update records #r9 and #r10, link row records #4 and #5 in the update operand list are added to the end of the link row table in FIG. 6, and link row addition records #4 and #5 are added to the end of the link row addition list in FIG. 6. As a result, the link row numbers of the link rows 4 and 5 in FIG. 17 are 4 and 5, respectively.

Therefore, the link row table in FIG. 19, the link row record in FIG. 20, the link row addition list in FIG. 19 and the link row addition record for the link row 5 in FIG. 24 are obtained in accordance with update records #r8, #r9 and #r10.

After this process has been completed, program control advances to step ST302.

At step ST302, when a forward link connected to a node and the preceding link of the node are not present because a link has been discontinued or divided, the connected link record for this forward link is deleted. It should be noted, however, that since a node addition record is not present when the node state of the node indicates "discontinued", the deletion of a connected link record is not required.

When the update record obtained at step ST300 indicates the discontinuance or the division of the first link of the link row, the connected link record for this link is deleted from the connected link information in the node addition record for the starting node of the link indicated in the update record.

Further, when the update record indicates the discontinuance or division of the link, and when the update record obtained at step ST300 indicates the discontinuance or division of the preceding link, the connected link record for the link is deleted from the connected link information in the node addition record for the starting node of the link indicated in the update record.

When the update record indicates the discontinuance of a link row, the connected link record is deleted from the connected link information in the node addition record for the starting node for each of the links of the link row, including the virtual link.

Since update record #r6 in FIG. 29 indicates the division of the first link L00 of the link row 0, the starting node N0 of the link L00 is obtained based on the starting node number (=0) indicated in link record #0 in FIG. 10 for the link L00. Then, the connected link record C00 indicating the link L00 is deleted from node addition record #0 in FIG. 14 for the node N0.

Further, since update record #r7 in FIG. 29 indicates the discontinuance of the link L01 of the link row 0, and since the previously obtained update record #r6 in FIG. 29 indicates the division of the link L00 in the link row 0 that is the preceding link for the link L01, the starting node N1 is obtained based on the starting node number in the link record #1 for the link L01. Then, the connected link record C10 indicating the link L01 is deleted from node addition record #1 in FIG. 14 for the node N1.

In addition, since update record #8 in FIG. 29 indicates the discontinuance of the link row 2, the starting nodes N2 and N5 of the link L20, and the virtual link L20' of the link row 2 are obtained based on the starting node numbers of corresponding link records. Then, the connected link record C22 indicating the link L20 is deleted from node addition record #2 in FIG. 14 for the starting node N2. Since the starting node N5 has already been discontinued, the deletion of the connected link record is not required.

After this process has been completed, program control advances to step ST303.

At step ST303, when a new link row is established based on update record obtained at step ST300, a connected link record indicating each link in the new link row is added to the connected link information for the node addition record of the starting node for a corresponding link.

Furthermore, the smallest number not yet used as a node-base link number for a conventional connected link record is provided as the node-base link number in the connected link record that is additionally prepared.

For update record #r10 in FIG. 29, starting nodes N0, N9 and N1 are obtained based on starting node numbers in the link records for the links L50, L51 and L51' that are included in link row addition record #5 in FIGS. 19 and 24 for the link row 5 obtained at step ST301. Then, connected link records indicating the links L50, L51 and L51' are added to the end of the connected link information in node addition records #0, #1 and #9 for the nodes N0, N9 and N1 that are included in the node addition list in FIG. 19 obtained at step ST301. As a result, connected link records #0, #1 and #9 shown in FIG. 23 are obtained in which connected link records C01, C90 and C12, indicating the links L50, L51 and L51', are entered.

At this time, link row number "5" for the link row 5 is entered as the connected link row number in the connected link record C12; intra-link-row link number "0" for the link L50 is entered as the intra-connected-link-row link number; and the smallest value "0", which differs from the "1" used for the connected link record C11 that is already present when this process is started, is entered as the node-base link number. The same process is performed to enter a node-base link number for the connected link records C01 and C90.

Similarly, for update record #r9 in FIG. 29, connected link records indicating the links L40, L41 and L41' are added to the end of the connected link information in node addition records #2, #7 and #8 in FIG. 19 for the nodes N2, N7 and N8. As a result, node addition records #2, #7 and #8 shown in FIG. 23 are obtained in which the connected link records C23, C71 and C80, indicating the links L40, L41 and L41', are entered.

After this process has been completed, program control advances to step ST304.

At step ST304, a check is performed to determine whether all the update records have been obtained from the road system update data. When all the update records have been obtained, program control advances to step ST305. When not all the update records have been obtained, program control returns to step ST300 and the processes at steps ST300 to ST304 are repeated.

At step ST305, the link addition record presence/absence information in the link row addition record that has been updated is examined from the update result based on the update record, and an address for the link addition record is stored in the corresponding link addition pointer in the link record that includes the link addition record. This address is obtained by adding the link addition record sizes of the link addition headers in the individual link addition records that are located at the beginning in the link addition list before the corresponding link addition record.

After the process has been completed, program control advances to step ST306.

At step ST306, the road system data header of the road system data is updated as the updating using the update records is performed. Thereafter, the road system data updating processing is terminated.

Through the processing performed at steps ST300 to ST306, the data in FIGS. 5, 6, 9, 10, 13 and 14, which are road system data representing the road system shown in FIG. 3, are updated to the data shown in FIGS. 18, 19, 20, 21, 22, 23 and 24, which are road system data representing the road system in FIG. 17.

Figure 38:
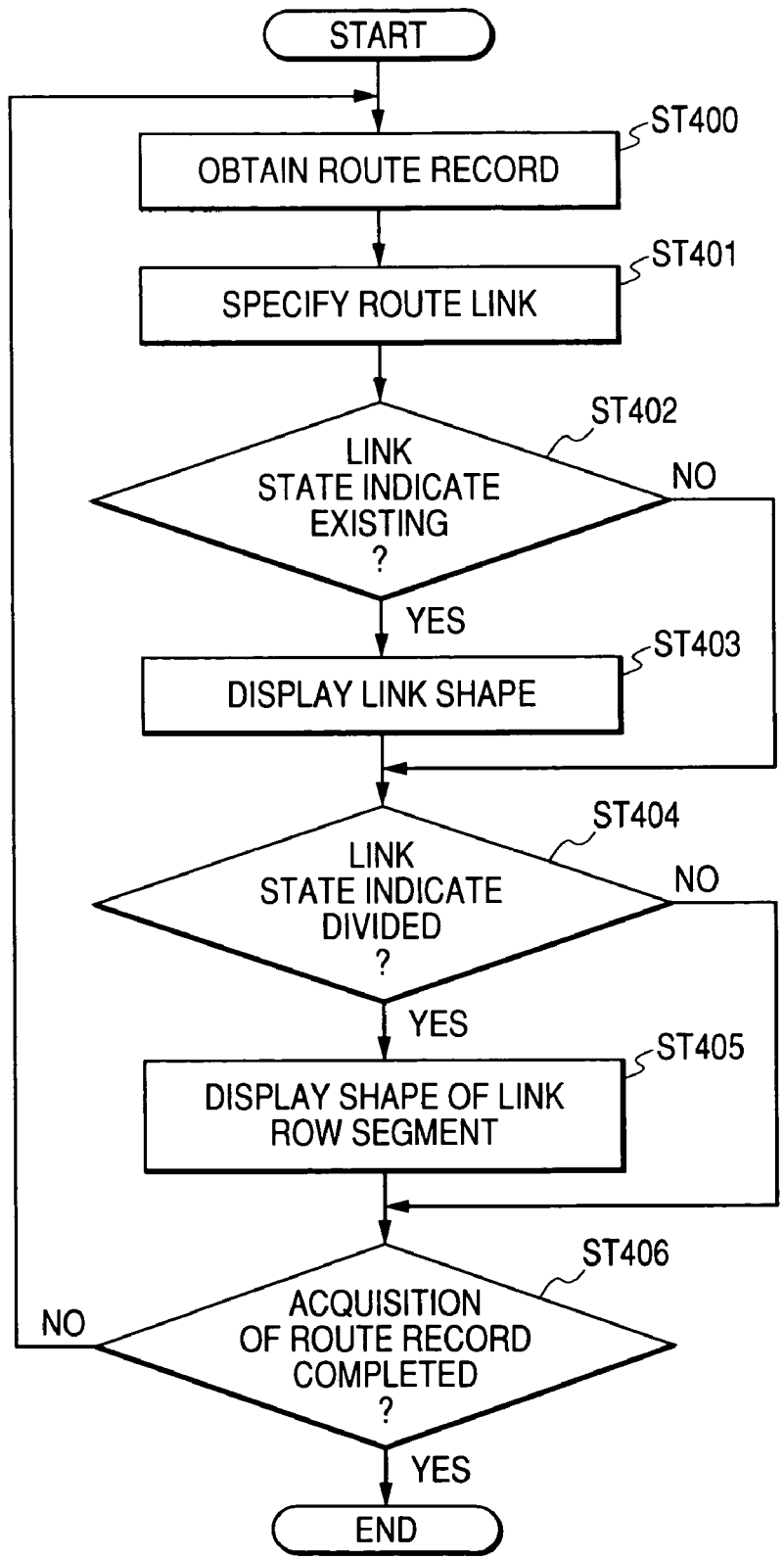
FIG. 38 is a detailed flowchart showing the route display processing according to the first embodiment.

FIG. 38 is a detailed flowchart showing the route display process at step ST22 in FIG. 31. At step ST400, one route record in the array is extracted from the route data obtained at step ST17. Program control then advances to step ST401.

At step ST401, links are specified for which the link numbers lie between the smallest and the largest link numbers in the route record obtained at step ST400.

When the map data have not yet been updated, for route record #0 in FIG. 32, the link L00, which has the link numbers 0 to 255, is specified, based on the link row table and the link row addition list in FIG. 6 that correspond to the road system in FIG. 3. As a result, link records #0 and link addition record #0 in FIG. 10 are obtained for the link L00. Similarly, for route record #1 in FIG. 34, the link L30, which has the link numbers 1280 to 1535, is specified, and the link record and the link addition record for the link L30 are obtained.

When the map data are updated, for route record #0 in FIG. 32, the link L00, which has the link numbers 0 to 255, is specified, based on the link row table and the link row addition list in FIG. 19 that correspond to the road system in FIG. 17. As a result, link record #0 and link addition record #0 in FIG. 21 are obtained for the link L00. Similarly, for route record #1 in FIG. 34, the link L30, which has the link numbers 1280 to 1535, is specified, and the link record and the link addition record for the link L30 are obtained.

After this process has been completed, program control advances to step ST402.

At step ST402, a check is performed to determine whether the link state in the link record for the link specified at step ST401 indicates "existing". When the link state indicates "existing", program control advances to step ST403. When the link state does not indicate "existing", program control moves to step ST404.

When the map data have not been updated, for route record #0 in FIG. 34, the link state in link record #0 in FIG. 10 for the link L00 indicates "existing", so that program control advances to step ST403. When the map data have been updated, for route record #0 in FIG. 34, the link state in link record #0 in FIG. 21 for the link L00 indicates "divided", so that program control is shifted to step ST404.

For route record #1 in FIG. 34, since the corresponding link L30 exists, program control moves to step ST403.

At step ST403, the node numbers of nodes at both ends of the link specified at step ST401 are obtained, based on the start node numbers in the link records for this link and the succeeding link specified at step ST401. Then, the node coordinates for the nodes at both ends of the link specified at step ST401 are obtained from the node table and the node addition table, and the link shape information is obtained from the link addition record for the link. In accordance with the thus obtained node coordinates and link shape information, the link specified at step ST401 is displayed, with the link shape enhanced, on the map screen displayed at step ST20.

When the map data have not been updated, for route record #0 in FIG. 34, node coordinates (x0, y0) and (x1, y1) for the nodes N0 and N1 are extracted from node addition records #1 and #2 in FIG. 14, and link shape information si00 is extracted from link addition record #0 in FIG. 10 for the link L00. Based on the node coordinates and the link shape information si00, the link L00 is displayed, with the shape enhanced, on the map screen.

Similarly, for route record #1 in FIG. 34, the corresponding link L30 is displayed, with the shape enhanced.

When this process has been completed, program control advances to step ST404.

At steps ST402 and ST403, the existing links corresponding to the route are displayed, with their shapes enhanced.

At step ST404, a check is performed to determine whether the link state in the link record specified at step ST401 indicates "divided". When the link state indicates "divided", program control advances to step ST405. But when the link state does not indicate "divided", program control is shifted to step ST406.

When the map data have not been updated, for route record #0 in FIG. 34, the link state for link record #0 in FIG. 10 for the link L00 indicates "existing", so that program control moves to step ST406. When the map data have been updated, for route record #0 in FIG. 34, the link state in link record #0 in FIG. 21 for the link L00 indicates "divided", so that program control advances to step ST405.

For route record #1 in FIG. 34, since the corresponding link L30 exists, program control is shifted to step ST406.

At step ST405, the links belonging to the link row, which is identified by the link segment number in the link record for the link that is specified at step ST401, are displayed, with their shapes enhanced, on the map screen provided at step ST20.

When the map data have been updated, for route record #0 in FIG. 34, the link row 5 having the link row number "5" is obtained from the link segment number of link record #0 in FIG. 21 for the link L00. In accordance with the link row record #5 in FIG. 20 and the link row addition record in FIG. 24 for the link row 5, the links L50, L51 are displayed, with the shape enhanced in the same manner as at step ST403, on the map screen. As is described above, even when the link L00 is divided, the correlation of the links can be maintained without changing the link numbers provided for the link Lr00 in FIG. 33, which, in accordance with the link for route calculation data, corresponds to the link L00. Therefore, the correct route can be displayed.

When this process has been completed, program control advances to step ST406.

At steps ST404 and ST405, the shapes of the links that correspond to the route and that are obtained by the division are displayed.

At step ST406, a check is performed to determine whether all the route records have been acquired from the route data.

When not all the route records have been acquired, program control returns to step ST400 and the processes at steps ST400 to ST406 are repeated. When all the route records have been obtained, the route display process is terminated.

In this manner, the link shapes that correspond to the route indicated by the route data are displayed. Further, based on the link state and the link row segment numbers, it is determined that the link has been divided, and the locations whereat the link row segments are stored in the link row record can be readily obtained. Therefore, even when the link has been divided, the route can be quickly displayed.

For the processing in FIG. 38, the link division is performed only once. However, when the link division has been performed multiple times, the processes at steps ST402 to ST405 need only be performed recursively, for each link in a link row segment, for the route to be displayed.

According to the first embodiment, since the data structure described above is employed for the map data, the node data can be stored, separate from the link row data, in the node table and the node addition table. Therefore, the node data stored therein do not overlap, repeated updating of the same node data can be avoided, and map data are obtained that are easily updated. Further, since the node number is used as a node identifier, the node data can be quickly obtained. In addition, when a storage medium on which the map data having the above described data structure are stored is employed, map data that are easily updated and for which fast map information processes can be performed can be provided for the map data processing apparatus. Furthermore, when the map data stored on the storage medium is employed, a map data processing apparatus can reduce the processing load, can enable faster map data updating, and can perform map data processing faster.

Moreover, in this embodiment, the connected link information constituting a connected link record indicating the forward links of the node is employed to represent links connected to the node. Therefore, when a link is discontinued or established, the connected link information can be updated by simple processing, such as the deletion or the addition of a connected link record, and map data can be obtained that is easily updated. Further, since only a connected link record representing the forward links of the node is provided, the data size of the map data can be reduced. Further, by using a storage medium on which the map data having the above described data structure are stored, map data that is easily updated can be provided for the map data processing apparatus. Furthermore, when the map data stored on the storage medium is employed, the map data processing apparatus can reduce the processing load, and can perform the updating of map data at a higher speed.

In addition, since the link row number and the intra-link-row link number are employed as connected link designation information in the connected link record, the location of the link record for the link that is connected to the node can be immediately obtained. Thus, map data can be provided from which the information for the link can be quickly obtained. By using these map data, the map data processing apparatus can reduce the processing load, and can perform the updating of map data at a higher speed.

Further, since the node-base link numbers are provided as the node-base link identities for the forward links connected to the node, the same node-base link numbers can be maintained, so long as the link exists. Therefore, even when a link is discontinued or established, the contents of the conventional traffic regulation records need not be changed, and map data that are easily updated can be obtained. By using these map data, the map data processing apparatus can reduce the processing load, and can perform the updating of map data at a higher speed.

Since the link row segment is provided as the link is divided, and since information concerning the link division is entered in the link record, i.e., the link state indicating that the link has been divided and the link row segment number indicating the link row segment are provided, the link division can be performed without changing the intra-link-row link numbers of the links following the link to be divided. In addition, for the link row segment, the link row record and the link row addition record can be quickly identified, and map data are provided that are easily updated and with which the route can be immediately displayed. By using the map data, the map data processing apparatus can reduce the processing load, can perform the updating of map data at a higher speed and can immediately display the route.

Since the node numbers are included in corresponding node associated information, such as the route guidance record, the updating of the map data is not required when the node associated information is updated, and map data that are easily updated can be obtained. By using the map data, the map data processing apparatus can reduce the processing load, and can perform the updating of map data at a higher speed.

Furthermore, in this embodiment, the link number provided for the link to be divided is distributed to obtained link segments, and the range of the link numbers of the obtained link segments is defined in accordance with the ranges obtained by equally dividing the range of the link numbers provided for the link that was divided. Therefore, all the links can be divided a predetermined number of times, and map data can be obtained that can easily be updated after the link division is performed. Further, when a storage medium on which map data having the above described data structure is employed, map data that are easily updated can be provided for the map data processing apparatus. Further, by using the map data stored on the storage medium, the map data processing apparatus can reduce the processing load and the updating of the map data can be performed at a higher speed.

Since the node numbers of the conventional nodes are not affected when the map data are updated while a node is discontinued or established, a change in the starting node number in the conventional link record and a change in the conventional route guidance record are not required. Thus, the map data can be more quickly updated.

Moreover, since the link row numbers for the conventional link rows and the intra-link-row link numbers for the links are unchanged when the map data are updated while a link is discontinued or established, changing the conventional connected link record is not required. Therefore, map data can be updated easily and more quickly.

Further, as the map data updating method employed when a link row is established, a connected link record for a node to which links of the new link row are connected is prepared based on the link row data for the new link row. Therefore, an update record used to add a connected link record is not require, and the map data can be updated by employing a smaller amount of road system update data.

Furthermore, as the map data updating method employed when a specific link is divided, link numbers within a predetermined range are provided for the specific link, and when this link is divided, numbers within a range defined by equally dividing the link number range for the specific link are provided for the obtained link segments. Therefore, all the links can be divided a predetermined number of times, and the updating of map data can be performed at a higher speed.

Second Embodiment

According to a second embodiment, when a link is divided, the link numbers provided for this link are distributed to the obtained link segments in proportion to the lengths of the link segments.

Figure 39:
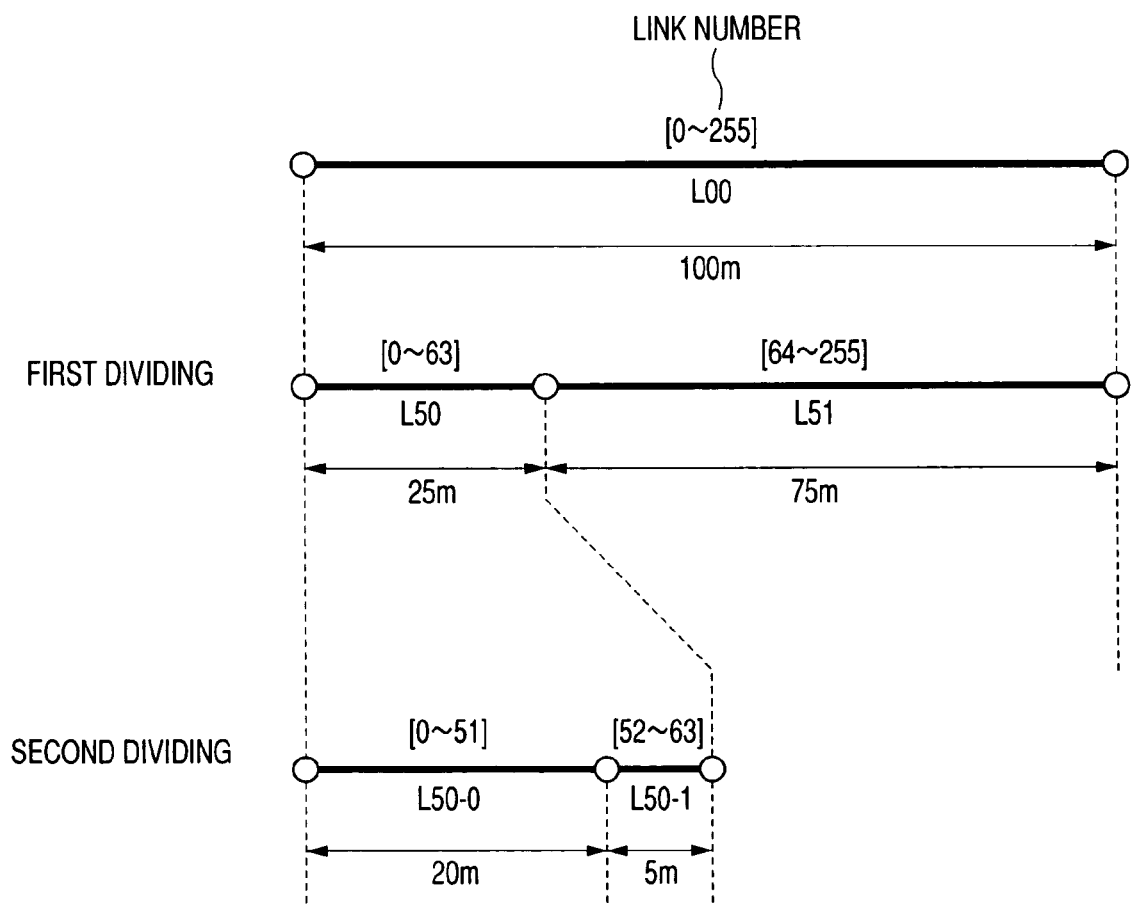
FIG. 39 is a diagram showing an example for providing link numbers for link segments according to a second embodiment of the invention.

FIG. 39 is a diagram showing an example for providing link numbers for the links L50 and L51 in FIG. 17 that are obtained by dividing the link L00 in FIG. 3. In FIG. 39, when the distance from one end to the other of the link L00, i.e., the link length is 100 m, and when the lengths of the links L50 and L51 obtained by dividing the link L00 are 25 m and 75 m, the link numbers within a range extending from 0 to 255, which are provided for the link L00, are distributed in accordance with the ratio of the lengths of the links L50 and L51 to the length of the link L00. As a result, link numbers 0 to 63 and 64 to 255 are respectively provided for the links L50 and L51.

FIG. 40 is a diagram showing a storage example according to the second embodiment for the link addition list for the link row 5 that consists of the links L50 and L51 obtained by dividing the link L00.

In the second embodiment, the link addition list in FIG. 40 is employed as the link addition list in FIG. 24 of the link row addition records for the link row 5 in the first embodiment.

In the list addition list in FIG. 40, link number information having a value of 64 is provided in link addition record #1, so that 0 to 63 and 64 to 255 are the link numbers provided for the links L50 and L51.

Further, as is shown in FIG. 39, when the link L50 is further divided to obtain a link L50-0 having a length of 20 m and a link L50-1 having a length of 5 m, the range 0 to 63, provided for the link L50, is distributed in accordance with the ratio of the lengths of the links L50-0 and L50-1 to the length of the link L50. As a result, link numbers ranging from 0 to 51 and 52 to 63 are respectively provided for the links L50-0 and L50-1. The ranges distributed in accordance with this ratio are actually 0 to 51.2 and 51.2 to 63; however, since the link numbers must be integers, the decimal portions of these ranges are respectively discarded and the numbers are rounded off to prevent the overlapping of the ranges.

In this manner, the division of a link can be repeated until the distribution of values within the range is disabled.

As is described above, according to the second embodiment, since the link numbers are provided in accordance with the ratio of the link lengths between the link segments and the link, all the links can substantially be divided the same number of times, regardless of the initial lengths of the links when the map data are prepared. Thus, the map data can be easily updated when the link is divided, and when a storage medium on which the map data having the above described data structure is stored is employed, map data that are easily updated can be provided for the map data processing apparatus. By employing the map data stored on the storage medium, the map data processing apparatus can reduce the processing load, and the updating of map data can be performed at a higher speed.

As the map data updating method employed when a link is divided, the link numbers are distributed in accordance with the link length ratio, so that the updating of map data can be performed faster.

For the first embodiment, a hard disk has been employed as a storage medium for the map data storage device 3. However, another readable-writable storage medium, such as a memory card or a magneto-optical disk, can also be employed.

Further, the map information has been stored on the hard disk of the map data storage device 3. However, the map information may be stored in read only memory, such as on a CD-ROM (Compact Disc-Read Only Memory) or a DVD-ROM, and may be read from the memory by using a reader.

Furthermore, a DVD-ROM has been employed as the storage medium for the map update information; however, another readable memory, such as a CD-ROM or a memory card, may be employed. Also a DVD-drive has been employed as the update data acquisition device 4; however, another compatible device may be employed used as the storage medium for map update information.

Moreover, map data have been read from the map data storage device 3; however, communication means may be employed to obtain map data from another device.

The map update data obtained by the update data acquisition device 4 have been stored in the map data storage device 3, and have been read there from. However, the map update data may be read from a map update information storage medium by using the update data acquisition device 4.

Map update information has been obtained from the map update data storage medium that serves as the update data acquisition device 4; however, communication means may be employed to obtain the map update data.

Further, the map update data obtained by the update data acquisition device 4 have been stored in the map data storage device 3, and have been read there from. However, communication means may be employed to obtain map update data from another device.

In the first embodiment, updated map data are not stored in the map data storage device 3; however, updated map data may be stored in the map data storage device 3.

The node number of the starting node of a link has been entered in the link record to designate the starting node; however, information may be stored that indicates the storage location of the starting node in the node record.

In addition, the link state and the link row segment number are entered in the link record as information associated with the link segments; however, only the link state may be entered, and a link row that includes has a link number for a link whose link state is "divided" may be searched for and employed as the link row segment.

In this invention, link row segments have been provided when a link is divided; however, instead of providing a link row segment, a before-division link may be replaced by link segments. That is, a node record and a node addition record for new nodes generated by dividing a link may be added to the node table and the node addition table, and the link record and the link addition record for a before-division link may be replaced with link records and link addition records for individual link segments obtained by division.

Further, in this invention, when a link row or a link is discontinued or established, both conventional link row numbers and conventional intra-link-row identification numbers have not been changed. However, either only conventional link row numbers or conventional intra-link-row identification numbers may be maintained.

Route calculation has been performed using route calculation data; however, road system data in map data may be employed for route calculation.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of displaying map data of a road system on a display device, the method comprising:
   obtaining node data which indicates information concerning nodes that represent points along a road;
   obtaining link data which indicates information that identifies a link that represents a road between the points;
   forming a link row which represents a series of roads as a series of links in the road system;
   forming link row data in which the link data for links constituting the link row are arranged in the order that the links are connected;
   assigning node identifiers which identify the nodes;
   expressing the road system by using the nodes and the links; and
   displaying the road system on the display device,
   wherein, the node data for each of the nodes of the road system are provided separately from the link row data;
   wherein, the node identifiers are provided for each of the nodes of the road system; and
   wherein, the link data includes information that indicates the node identifier for only one node located at one link end that is defined in accordance with the direction of the link row.

2. The method according to claim 1, wherein node numbers representing an arrangement of the node data are employed as the node identifiers.

3. The method according to claim 2, wherein
   connected link information representing links connected to a node are provided in response to each of the node, and includes connected link designation information in response to a link row that the links belong to; and
   the connected link designation information depicts a link that is selected from a corresponding link row in accordance with a direction of the link row.

4. The method according to claim 1, wherein
   connected link information representing links connected to a node are provided in response to each of the node, and includes connected link designation information in response to a link row that the links belong to; and
   the connected link designation information depicts a link that is selected from a corresponding link row in accordance wit a direction of the link row.

5. The method according to claim 4, wherein the connected link designation information depicts a link by using a link row identifier, which is provided for a link row to identify the link row, and an intra-link-row link identifier, which is provided for a link, in accordance with the direction of the link row, to identify a link in the link row.

6. The method according to claim 4, wherein
   for each of the link row, one link is selected from links connected to a node in accordance with the direction of a link row; and
   a node-base link identifier is provided to the link to identify the selected link.

7. The method according to claim 4, wherein
   in a case where a link is divided, link row data are provided for a link row segment consisting of a link row composed of link segments obtained by dividing the link; and
   link data for the link segments include information concerning the link row segment.

8. The method according to claim 1, wherein node associated information is provided for a node and includes a node identifier for an associated node.

9. A map data processing apparatus comprising:
   a map data acquisition unit for obtaining map data according to the method of any one of claims 1 to 8;
   a map update data acquisition unit for obtaining map update data used to update the map data;
   a map data updating unit for employing the map update data obtained by the map update data acquisition unit to update the map data obtained by the map data acquisition unit; and
   an output device for displaying the map update data.

10. A method of updating map data of a road system for display of the road system on a display device, the method comprising:
    obtaining node data which indicates information concerning nodes that represents points along a road;
    obtaining link data which indicates information concerning a link that represents a road between the points;
    forming a link row which provides a series of roads as a series of links in the road system;
    forming link row data in which the link data for links constituting the link row are arranged in the order that the links are connected; and
    assigning node identifiers which identify the nodes;
    updating the map data of the road system while node identifiers for conventional existing nodes are not changed, in a case where a node is discontinued or established;
    expressing the road system by using the nodes and the links; and
    displaying the road system on the display device,
    wherein, the node data for each of the nodes of the road system are provided separately from the link row data;
    wherein, the node identifiers are provided for each of the nodes of the road system;
    wherein, node numbers representing an arrangement of the node data are employed as the node identifiers; and
    wherein, link data include information that indicates the node identifier for a node located at one link end that is defined in accordance with the direction of the link row.

11. A method of updating map data of a road system for display of the road system on a display device, the method comprising:
    obtaining node data which indicates information concerning nodes that represents points along a road;
    obtaining link data which indicates information concerning a link that represents a road between the points;
    forming a link row which provides a series of roads as a series of links in the road system;
    forming link row data in which the link data for links constituting the link row are arranged in the order that the links are connected;
    assigning node identifiers which identify the nodes;
    updating the map data of the road system while, at least, either link row identifiers for conventional existing link rows or intra-link-row link identifiers for conventional existing links are not changed, in a case where a link is discontinued or established;
    expressing the road system by using the nodes and the links; and
    displaying the road system on the display device,
    wherein, the node data for each of the nodes of the road system are provided separately from the link row data;
    wherein, the node identifiers are provided for each of the nodes of the road system;
    wherein, the link data include information that indicates the node identifier for a node located at one link end that is defined in accordance with the direction of the link row;

wherein, connected link information representing links connected to a node are provided in response to each of the node, and includes connected link designation information in response to a link row that the links belong to;

wherein, the connected link designation information depicts a link that is selected from a corresponding link row in accordance with a direction of the link row; and wherein, the connected link designation information depicts a link by using a link row identifier, which is provided for a link row to identify the link row, and an intra-link-row link identifier, which is provided for a link, in accordance with the direction of the link row, to identify a link in the link row.

12. A method of updating map data of a road system for display of the road system on a display device, the method comprising:

obtaining node data which indicates information concerning nodes that represents points along a road;

obtaining link data which indicates information that identifies a link that represents a road between the points;

forming a link row which provides a series of roads as a series of links in the road system;

forming link row data in which the link data for links constituting the link row are arranged in the order that the links are connected;

assigning node identifiers which identify the nodes;

employing link row data obtained by updating the map data of the road system to update the connected link information, in a case where a link is discontinued or established;

expressing the road system by using the nodes and the links; and displaying the road system on the display device, wherein, the node data for each of the nodes of the road system are provided separately from the link row data;

wherein, the node identifiers are provided for each of the nodes of the road system;

wherein, the link data includes information that indicates the node identifier for only one node located at one link end that is defined in accordance with the direction of the link row;

wherein, connected link information representing links connected to a node are provided in response to each of the node, and includes connected link designation information in response to a link row that the links belong to;

wherein, the connected link designation information depicts a link that is selected from a corresponding link row in accordance with a direction of the link row; and wherein, the connected link designation information depicts a link by using a link row identifier, which is provided for a link row to identify the link row, and an intra-link-row link identifier, which is provided for a link, in accordance with the direction of the link row, to identify a link in the link row.

13. A method of updating map data of a road system for display of the road system on a display device, the method comprising:

obtaining nodes representing points along a road;

obtaining links representing the road between the points; and providing link numbers, within a specific range, for the links in the road system respectively;

distributing the link numbers within the specific range provided for a before-division link to link segments obtained by division;

determining the range for link numbers for the link segments obtained by the distribution in accordance with a range obtained by equally dividing the specific range for the link numbers of the before-division link;

expressing the road system by using the nodes and the links; and displaying the road system on the display device.

14. A method of updating map data of a road system for display of the road system on a display device, the method comprising:

obtaining nodes representing points along a road;

obtaining links representing the road between the points; and providing link numbers, within a specific range, for the links in the road system respectively;

distributing the link numbers within the specific range provided for a before-division link to link segments obtained by division;

determining the range for link numbers for the link segments obtained by the distribution in accordance wit a ratio of link lengths of the link segments to a link length of the before-division link;

expressing the road system by using the nodes and the links; and displaying the road system on the display device.

15. A computer-readable medium storing a program to have a computer carry out a method of displaying map data of a road system on a display device, the method comprising:

obtaining node data which indicates information concerning nodes that represents points along a road;

obtaining link data which indicates information that identifies a link that represents a road between the points;

forming a link row which provides a series of roads as a series of links in the road system;

forming link row data in which the link data for links constituting the link row are arranged in the order that the links are connected;

assigning node identifiers which identify the nodes;

expressing the road system by using the nodes and the links; and displaying the road system on the display device, wherein, the node data for each of the nodes of the road system are provided separately from the link row data;

wherein, the node identifiers are provided for each of the nodes of the road system;

wherein, node numbers representing an arrangement of the node data are employed as the node identifiers; and wherein, the link data includes information that indicates the nude identifier for a one node located at one link end that is defined in accordance with the direction of the link row.

16. A computer-readable medium storing a program to have a computer carry out a method of displaying map data of a road system on a display device, the method comprising:

obtaining node data which indicates information concerning nodes that represents points along a road;

obtaining link data which indicates information that identifies a link that represents a road between the points;

forming link row which provides a series of roads as a series of links in the road system;

forming link row data in which the link data for links constituting the link row are arranged in the order that the links are connected;

assigning node identifiers which identify the nodes;

expressing the road system by using the nodes and the links; and displaying the road system on the display device, wherein, the node data for each of the nodes of the road system are provided separately from the link row data;

wherein, the node identifiers are provided for each of the nodes of the road system;

wherein, node numbers representing an arrangement of the node data are employed as the node identifiers;

wherein, the link data includes information that indicates the node identifier for only one node located at one link end that is defined in accordance with the direction of the link row;

wherein, connected link information representing links connected to a node are provided in response to each of the node, and includes connected link designation information in response to a link row that the links belong to; and wherein, the connected link designation information depicts a link that is selected from a corresponding link row in accordance with a direction of the link row.

17. A computer-readable medium storing a program to have a computer carry out a method of displaying map data of a road system on a display device, the method comprising:

obtaining nodes representing points along a road;

obtaining links representing the road between the points;

providing link numbers, within a specific range, for the links in the road system respectively;

expressing the road system by using the nodes and the links; and displaying the road system on the display device, wherein, the link numbers within the specific range provided for a before-division link are distributed to link segments obtained by division; and wherein, the range for link numbers for the link segments obtained by the distribution is determined in accordance with a range obtained by equally dividing the specific range for the link numbers of the before-division link.

18. A computer-readable medium storing a program to have a computer carry out a method of displaying map data of a road system on a display device, the method comprising:

obtaining nodes representing points along a road;

obtaining links representing the road between the points;

providing link numbers, within a specific range, for the links in the road system respectively;

expressing the road system by using the nodes and the links; and displaying the road system on the display device, wherein, the link numbers within the specific range provided for a before-division link are distributed to link segments obtained by division; and wherein, the range for link numbers for the link segments obtained by the distribution is determined in accordance with a ratio of link lengths of the link segments to a link length of the before-division link.

19. A map data processing apparatus comprising:

a map data reading unit for reading map data stored in computer-readable medium according to any one of claims 15 to 18;

a map update data acquisition unit for obtaining map update data used to update the map data stored in the map data storage medium;

a map data updating unit for employing the map update data obtained by the map update data acquisition unit to update the map data read by the map data reading unit; and an output device for displaying the map update data.

* * * * *